United States Patent
Watanabe et al.

(10) Patent No.: US 6,330,409 B1
(45) Date of Patent: *Dec. 11, 2001

(54) PROCESS CARTRIDGE AND ELECTROPHOTOGRAPHIC IMAGE FORMING APPARATUS

(75) Inventors: Kazushi Watanabe, Mishima; Isao Ikemoto, Kashiwa; Atsushi Numagami, Mishima; Katsunori Yokoyama, Susono, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/480,178

(22) Filed: Jan. 10, 2000

Related U.S. Application Data

(62) Division of application No. 08/939,118, filed on Sep. 26, 1997.

(30) Foreign Application Priority Data

Sep. 26, 1996 (JP) .................................................. 8-277524
Sep. 25, 1997 (JP) .................................................. 9-279616

(51) Int. Cl.[7] .................................................. G03G 21/16
(52) U.S. Cl. .................................................. 399/111; 399/167
(58) Field of Search .................................................. 399/111, 116, 399/117, 167, 107, 110, 159

(56) References Cited

U.S. PATENT DOCUMENTS

| | | |
|---|---|---|
| 3,542,178 | 11/1970 | Ripple . |
| 3,865,500 | 2/1975 | Newell .................................................. 403/359 |
| 4,452,922 | 6/1984 | Jamison et al. .................................................. 403/359 X |
| 4,829,335 | 5/1989 | Kanemistsu et al. . |
| 5,023,660 | 6/1991 | Ebata et al. . |
| 5,095,335 | 3/1992 | Watanabe et al. .................................................. 399/111 |
| 5,151,734 | 9/1992 | Tsuda et al. . |
| 5,294,957 | 3/1994 | Ahn .................................................. 399/111 |

(List continued on next page.)

FOREIGN PATENT DOCUMENTS

| | | |
|---|---|---|
| 0-735-432 | 10/1996 | (EP) . |
| 0 797 125 | 9/1997 | (EP) . |
| 3-256058 | 11/1991 | (JP) . |
| 7-92884 | 4/1995 | (JP) . |
| 8-185108 | 7/1996 | (JP) . |
| 91-8911 | 6/1991 | (KR) . |

OTHER PUBLICATIONS

Korean Patent Office Communication dated May 7, 2001.
European Patent Office Communication mailed Apr. 11, 2001.
English Translation of Korean Office Action dated May 7, 2001.

*Primary Examiner*—Sandra Brase
(74) *Attorney, Agent, or Firm*—Fitzpatrick, Cella, Harper & Scinto

(57) ABSTRACT

A process cartridge detachably mountable to a main assembly of an electrophotographic image forming apparatus, wherein said main assembly includes a motor, a main assembly side gear for receiving driving force from said motor and a hole defined by twisted surfaces, said hole being substantially coaxial with said gear, said process cartridge includes an electrophotographic photosensitive drum; process means actable on said photosensitive drum; a projection engageable with said twisted surfaces, said projection being provided at a longitudinal end of said photosensitive drum, wherein said projection is non-twisted, and when said main assembly side gear rotates with said hole and projection engaged with each other, rotational driving force is transmitted from said gear to said photosensitive drum through engagement between said hole and said projection; and a resilient member for urging said process cartridge in a longitudinal direction of said photosensitive drum when said process cartridge is mounted to the main assembly.

10 Claims, 24 Drawing Sheets

U.S. PATENT DOCUMENTS

| | | | |
|---|---|---|---|
| 5,331,378 | 7/1994 | Baker et al. | 399/111 |
| 5,463,446 | 10/1995 | Watanabe et al. | |
| 5,533,825 | 7/1996 | Stone | 403/359 |
| 5,602,623 | 2/1997 | Nishibata et al. | 399/111 |
| 5,631,726 | 5/1997 | Sawada | 399/111 |
| 5,752,136 | 5/1998 | Sanchez et al. | 399/117 |
| 5,903,803 | 5/1999 | Kawai et al. | 399/116 |
| 5,940,655 | 8/1999 | Sano et al. | 399/69 |
| 6,006,058 | 12/1999 | Watanabe et al. | 399/167 |
| 6,029,032 * | 2/2000 | Watanabe et al. | 399/111 |

* cited by examiner

PROCESS CARTRIDGE AND ELECTROPHOTOGRAPHIC IMAGE FORMING APPARATUS

This is a divisional of application Ser. No. 08/939,118, filed Sep. 26, 1997.

FIELD OF THE INVENTION AND RELATED ART

The present invention relates to a process cartridge and an electrophotographic image forming apparatus.

Here, the electrophotographic image forming apparatus forms an image on a recording material using an electrophotographic image formation process. Examples of the electrophotographic image forming apparatus includes an electrophotographic copying machine, an electrophotographic printer (laser beam printer, LED printer or the like), a facsimile machine and a word processor or the like.

The process cartridge contains integrally an electrophotographic photosensitive member and charging means, developing means or cleaning means, and is detachably mountable relative to a main assembly of the image forming apparatus. It may integrally contain the electrophotographic photosensitive member and at least one of the charging means, the developing means and the cleaning means. As another example, it may contain the electrophotographic photosensitive member and at least the developing means.

In an electrophotographic image forming apparatus using an electrophotographic image forming process, the process cartridge is used, which contains the electrophotographic photosensitive member and process means actable on said electrophotographic photosensitive member, and which is detachably mountable as a unit to a main assembly of the image forming apparatus (process cartridge type). With this process cartridge type, maintenance of the apparatus can be carried out in effect by the user without depending on a serviceman. Therefore, the process cartridge type is now widely used in electrophotographic image forming apparatuses.

The present invention is directed to a further improvement of such a process cartridge.

A driving system for a photosensitive member in a process cartridge type, is disclosed in U.S. Pat. Nos. 4,829,335 and 5,023,660.

SUMMARY OF THE INVENTION

Accordingly, it is a principal object of the present invention to provide a process cartridge and an electrophotographic image forming apparatus wherein the rotation accuracy of an electrophotographic photosensitive drum is improved.

It is another object of the present invention to provide a process cartridge and an electrophotographic image forming apparatus wherein driving force is transmitted by abutment between a projection and an edge of a hole.

It is a further object of the present invention to provide a process cartridge and an electrophotographic image forming apparatus wherein engagement between a projection and a hole is firm.

It is a further object of the present invention to provide a process cartridge and an electrophotographic image forming apparatus wherein driving force is transmitted to an electrophotographic photosensitive drum by engagement between a non-twisted projection and a twisted hole.

It is a further object of the present invention to provide a process cartridge and an electrophotographic image forming apparatus wherein a projection is engageable with twisted surfaces, and the projection is provided at a longitudinal end of a photosensitive drum, wherein the projection is not twisted, and when a main assembly side gear rotates with the hole and projection engaged with each other, rotational driving force is transmitted from the gear to the photosensitive drum through engagement between the hole and the projection.

It is a further object of the present invention to provide a process cartridge and an electrophotographic image forming apparatus wherein a projection is engageable with twisted surfaces, and the projection is provided at a longitudinal end of a photosensitive drum, wherein the projection is not twisted, and when a main assembly side gear rotates with the hole and projection engaged with each other, rotational driving force is transmitted from the gear to the photosensitive drum through engagement between the hole and the projection, and wherein the projection is not pulled by the hole.

It is a further object of the present invention to provide a process cartridge and an electrophotographic image forming apparatus wherein when a process cartridge is mounted to the main assembly of the apparatus, the process cartridge is correctly positioned in the longitudinal direction of the photosensitive drum.

It is a further object of the present invention to provide a process cartridge and an electrophotographic image forming apparatus wherein an elastic member is provided to urge the process cartridge in the longitudinal direction of a photosensitive drum when a process cartridge is mounted to a main assembly of an apparatus.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Hereinafter, the embodiments of the present invention will be described with reference to the drawings.

Next, desirable embodiments of the present invention will be described. In the following description, the "widthwise" direction of a process cartridge B means the direction in which the process cartridge B is installed into, or removed from, the main assembly of an image forming apparatus, and coincides with the direction in which a recording medium is conveyed. The "lengthwise" direction of the process cartridge B means a direction which is intersectional with (substantially perpendicular to) the direction in which the process cartridge B is installed into, or removed from, the main assembly 14. The lengthwise direction is parallel to the surface of the recording medium, and intersectional with (substantially perpendicular to) the direction in which the recording medium is conveyed. Further, the "left" or "right" means the left or right relative to the direction in which the recording medium is conveyed, as seen from above.

Figure 1:
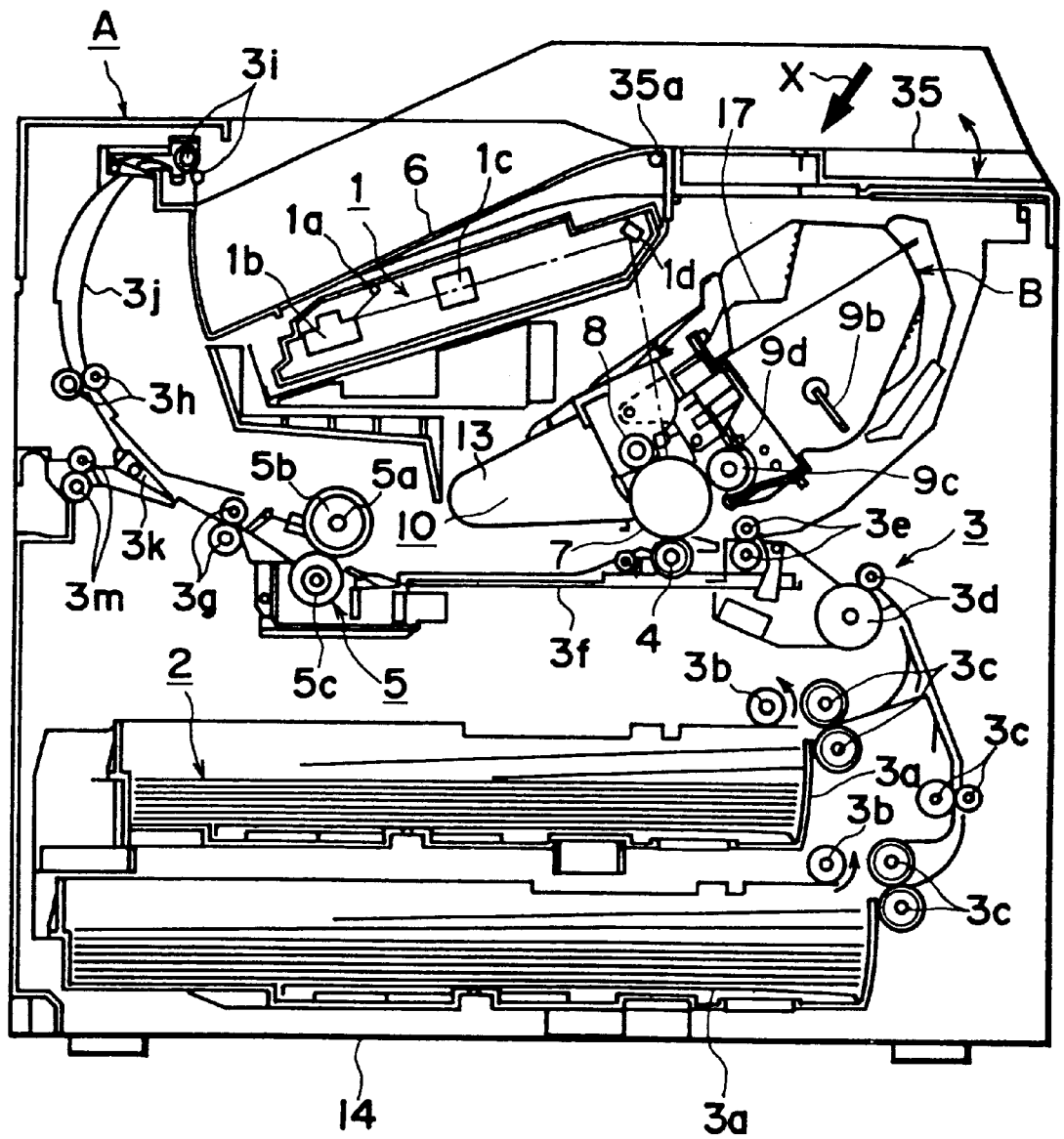
FIG. 1 is a vertical section of an electrophotographic image forming apparatus.
Figure 2:
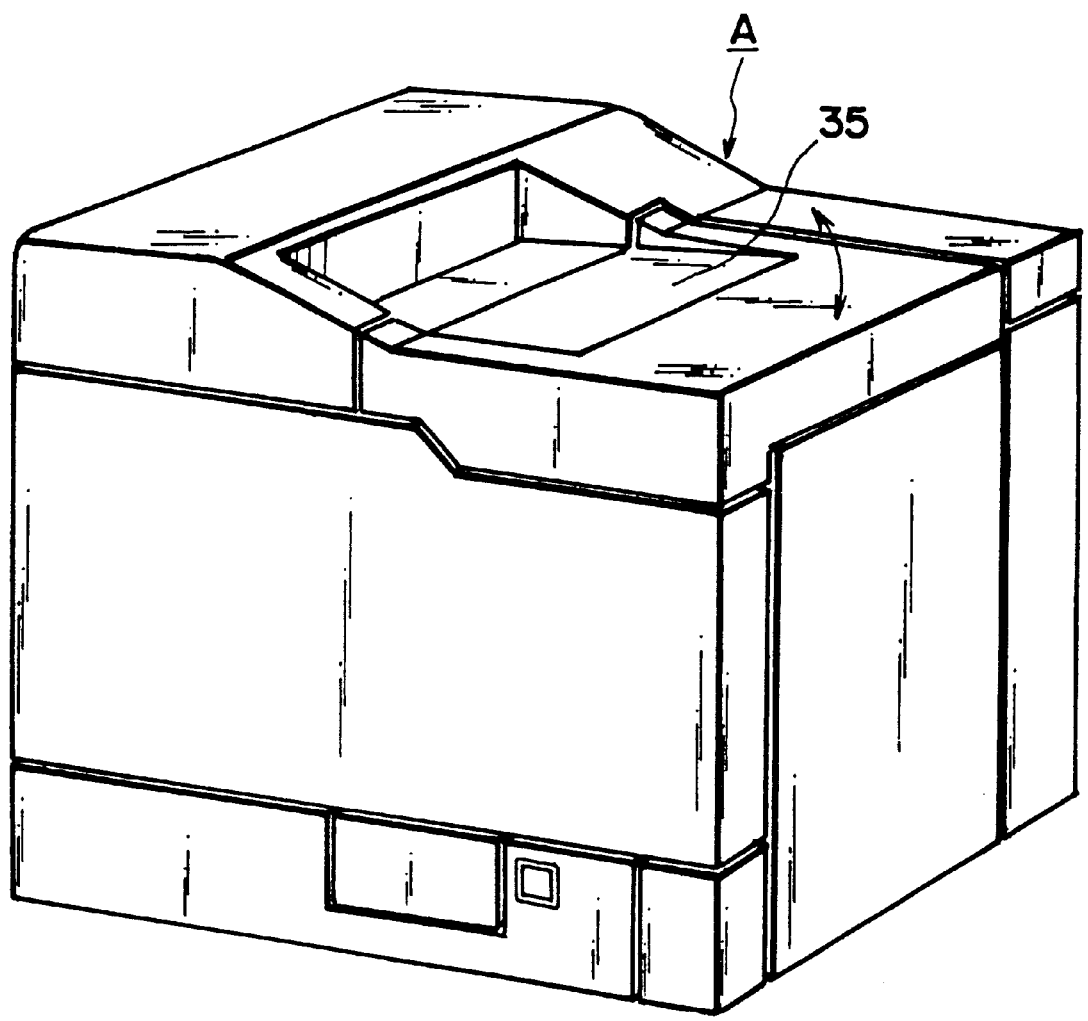
FIG. 2 is an external perspective view of the apparatus illustrated in FIG. 1.
Figure 3:
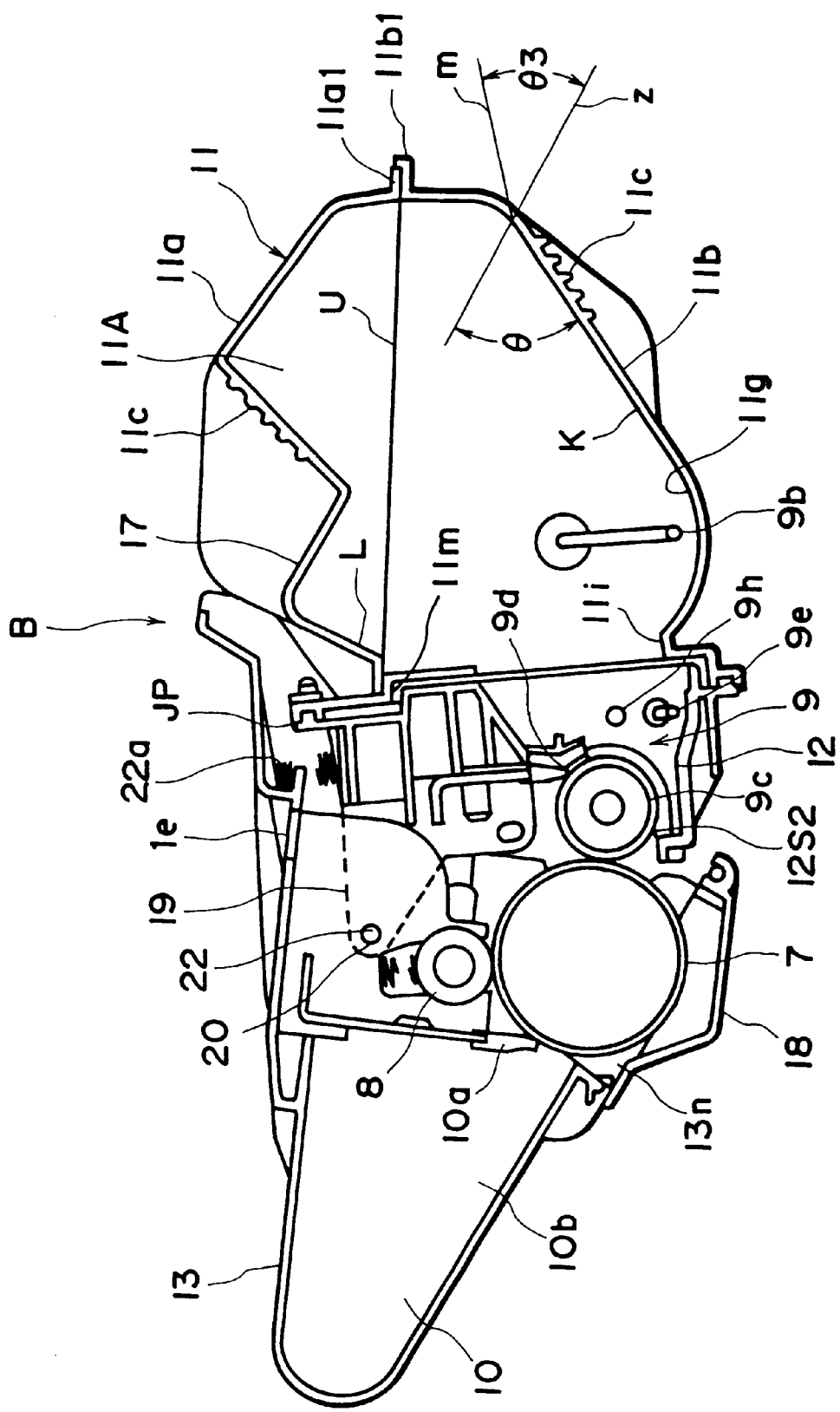
FIG. 3 is a cross-section of a process cartridge.
Figure 4:
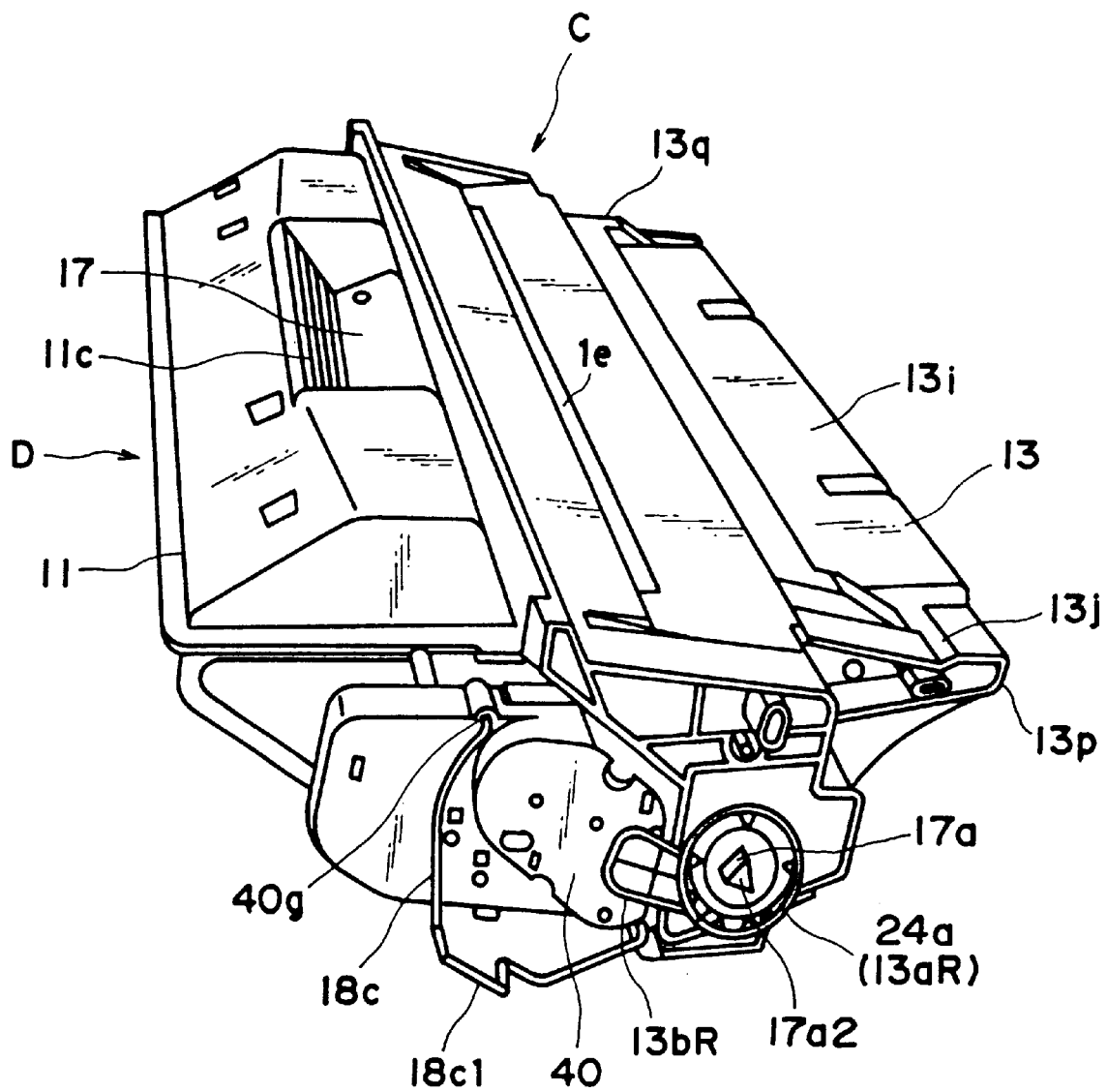
FIG. 4 is an external perspective view of the process cartridge illustrated in FIG. 3, as seen from the top right direction.
Figure 5:
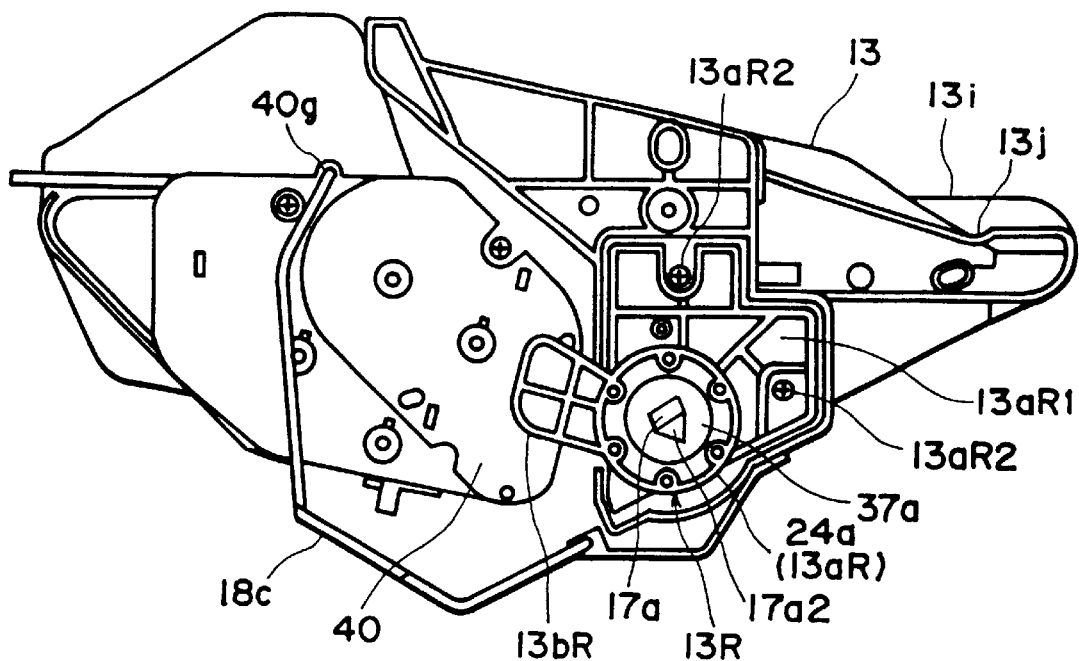
FIG. 5 is the right-hand side view of the process cartridge illustrated in FIG. 3.
Figure 6:
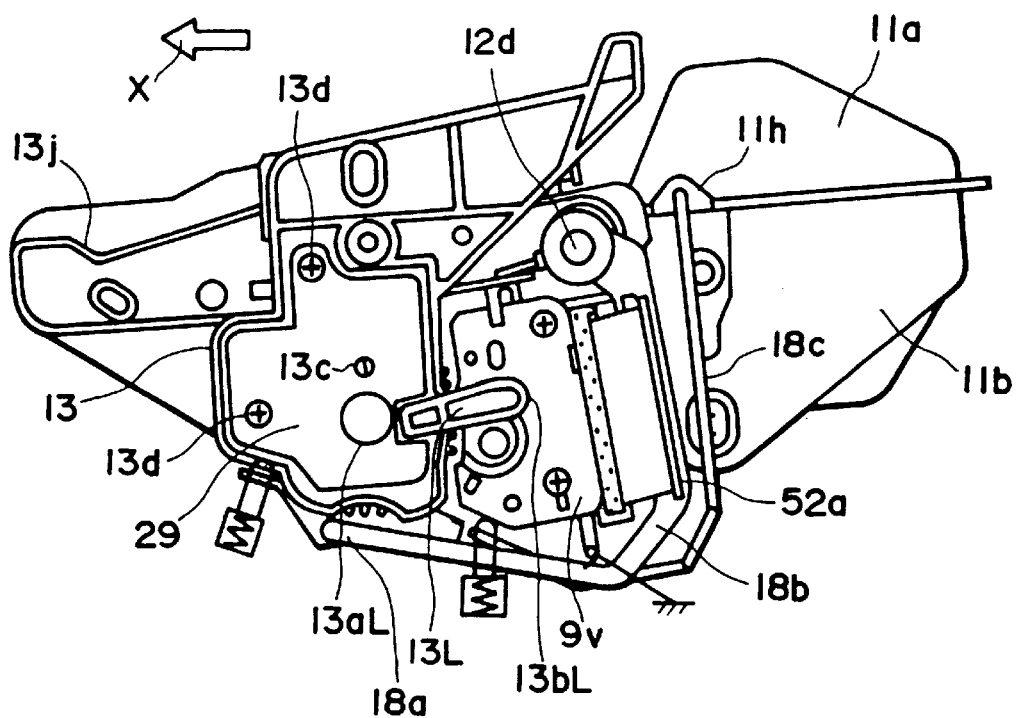
FIG. 6 is the left-hand side view of the process cartridge illustrated in FIG. 3.
Figure 7:
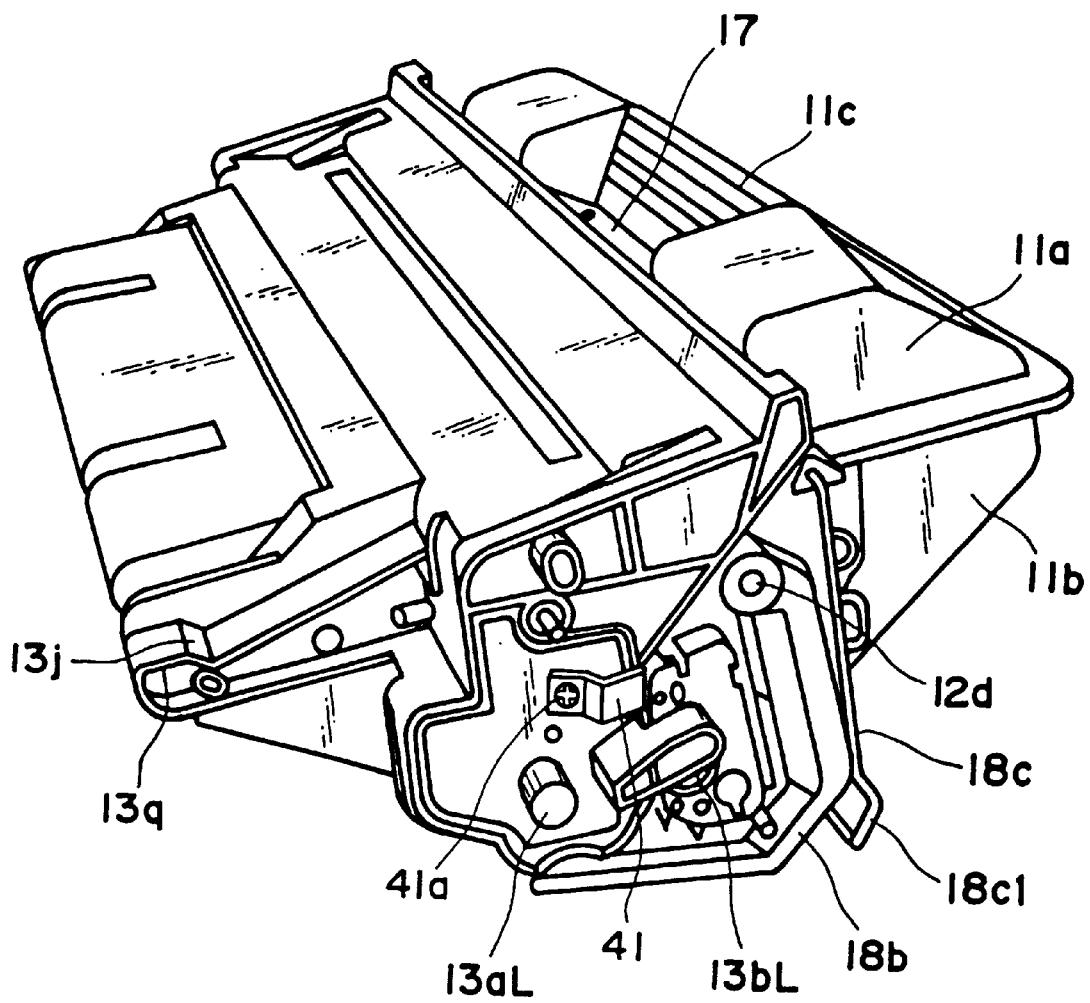
FIG. 7 is an external perspective view of the process cartridge illustrated in FIG. 3, as seen from the top left direction.
Figure 8:
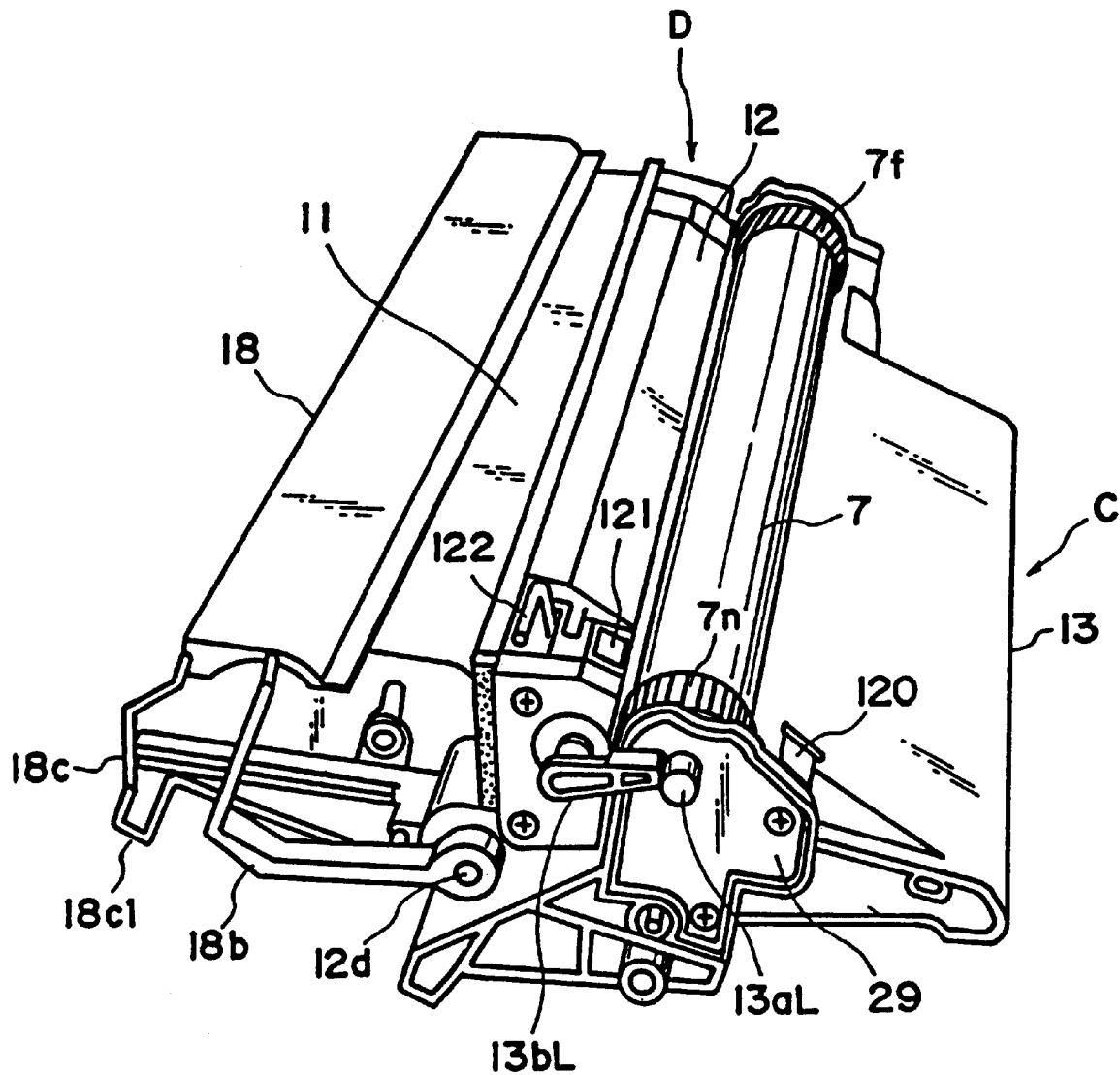
FIG. 8 is an external perspective view of the bottom left side of the process cartridge illustrated in FIG. 3.

FIG. 1 is an electrophotographic image forming apparatus (laser beam printer) which embodies the present invention, depicting the general structure thereof; FIG. 2, an external perspective thereof; and FIGS. 3–8 are drawings of process cartridges which embody the present invention. More specifically, FIG. 3 is a cross-section of a process cartridge; FIG. 4, an external perspective view of the process cartridge; FIG. 5, a right-hand side view of the process cartridge; FIG. 6, a left-hand side view of the process cartridge; FIG. 7, a perspective view of the process cartridge as seen from the top left direction; and FIG. 8 is a perspective view of the process cartridge as seen from the bottom left direction. In the following description, the "top" surface of the process cartridge B means the surface which faces upward when the process cartridge B is in the main assembly 14 of the image forming apparatus, and the "bottom" surface means the surface which faces downward.

(Electrophotographic Image Forming Apparatus A and Process Cartridge B)

First, referring to FIGS. 1 and 2, a laser beam printer A as an electrophotographic image forming apparatus which embodies the present invention will be described. FIG. 3 is a cross-section of a process cartridge which also embodies the present invention.

Referring to FIG. 1, the laser beam printer A is an apparatus which forms an image on a recording medium (for example, recording sheet, OHP sheet, and fabric) through an electrophotographic image forming process. It forms a toner image on an electrophotographic photosensitive drum (hereinafter, photosensitive drum) in the form of a drum. More specifically, the photosensitive drum is charged with the use of a charging means, and a laser beam modulated with the image data of a target image is projected from an optical means onto the charged peripheral surface of the photosensitive drum, forming thereon a latent image in accordance with the image data. This latent image is developed into a toner image by a developing means. Meanwhile, a recording medium 2 placed in a sheet feeding cassette 3a is reversed and conveyed by a pickup roller 3b, a conveyer roller pairs 3c and 3d, and register roller pair 3e, in synchronism with the toner formation. Then, voltage is applied to an image transferring roller 4 as a means for transferring the toner image formed on the photosensitive drum 7 of the process cartridge B, whereby the toner image is transferred onto the recording medium 2. Thereafter, the recording medium 2, onto which the toner image has been transferred, is conveyed to a fixing means 5 by guiding conveyer 3f. The fixing means 5 has a driving roller 5c, and a fixing roller 5b containing a heater 5a, and applies heat and pressure to the recording medium 2 as the recording medium 2 is passed through the fixing means 5, so that the image having been transferred onto the recording medium 2 is fixed to the recording medium 2. Then, the recording medium 2 is conveyed farther, and is discharged into a delivery tray 6 through a reversing path 3j, by discharging roller pairs 3g, 3h and 3i. The delivery tray 6 is located at the top of the main assembly 14 of the image forming apparatus A. It should be noted here that a pivotable flapper 3k may be operated in coordination with a discharge roller pair 3m to discharge the recording medium 2 without passing it through the reversing path 3j. The pickup roller 3b, conveyer roller pairs 3c and 3d, register roller pair 3e, guiding conveyer 3f, discharge roller pairs 3g, 3h and 3i, and discharge roller pair 3m constitute a conveying means 3.

Referring to FIGS. 3–8, in the process cartridge B, on the other hand, the photosensitive drum 7 with a photosensitive layer 7e (FIG. 11) is rotated to uniformly charge its surface by applying voltage to the charging roller 8 as a photosensitive drum charging means. Then, a laser beam modulated with the image data is projected onto the photosensitive drum 7 from the optical system 1 through an exposure opening 1e, forming a latent image on the photosensitive drum 7. The thus formed latent image is developed with the use of toner and the developing means 9. More specifically, the charging roller 8 is disposed in contact with the photosensitive drum 7 to charge the photosensitive drum 7. It is rotated by the rotation of the photosensitive drum 7. The developing means 9 provides the peripheral surface area (area to be developed) of the photosensitive drum 7 with toner so that the latent image formed on the photosensitive drum 7 is developed. The optical system 1 comprises a laser diode 1a, a polygon mirror 1b, a lens 1c, and a deflective mirror 1d (FIG. 1).

In the developing means 9, the toner contained in a toner container 11A is delivered to a developing roller 9c by the rotation of a toner feeding member 9b. The developing roller 9c contains a stationary magnet. It is also rotated so that a layer of toner with triboelectric charge is formed on the peripheral surface of the developing roller 9c. The image developing area of the photosensitive drum 7 is provided with the toner from this toner layer, the toner is transferred onto the peripheral surface of the photosensitive drum 7 in a manner to reflect the latent image, visualizing the latent image as a toner image. The developing blade 9d is a blade which regulates the amount of the toner adhered to the peripheral surface of the developing roller 9c and also triboelectrically charges the toner. Adjacent to the developing roller 9e, a toner stirring member 9c is rotatively disposed to circulatively stir the toner within the image developing chamber.

After the toner image formed on the photosensitive drum 7 is transferred onto the recording medium 2 by applying voltage with polarity opposite to that of the toner image to the image transferring roller 4, the residual toner on the photosensitive drum 7 is removed by the cleaning means 10. The cleaning means 10 comprises an elastic cleaning blade 10a disposed in contact with the photosensitive drum 7, and the toner remaining on the photosensitive drum 7 is scraped off by the elastic cleaning blade 10a, being collected into a waste toner collector 10b.

The process cartridge B is formed in the, following manner. First, a toner chamber frame 11 which comprises a toner container (toner storing portion) 11A for storing toner, is joined with an image developing chamber frame 12 which houses the image developing means 9 such as an image developing roller 9c, and then, a cleaning chamber frame 13, in which the photosensitive drum 7, the cleaning means 10 such as the cleaning blade 10a, and the charging roller 8 are mounted, is joined with the preceding two frames 11 and 12 to complete the process cartridge B. The thus formed process cartridge B is removably installable into the main assembly 14 of the image forming apparatus A.

The process cartridge B is provided with an exposure opening through which a light beam modulated with image data is projected onto the photosensitive drum 7, and a transfer opening 13n through which the photosensitive drum 7 opposes the recording medium 2. The exposure opening 1e is a part of the cleaning chamber frame 13, and the transfer opening 13n is located between the image developing chamber frame 12 and the cleaning chamber frame 13.

Next, the structure of the housing of the process cartridge B in this embodiment will be described.

The process cartridge in this embodiment is formed in the following manner. First the toner chamber frame 11 and the image developing chamber frame 12 are joined, and then, the cleaning chamber frame 13 is rotatively joined with the preceding two frames 11 and 12 to complete the housing. In this housing, the aforementioned photosensitive drum 7, charging roller 8, developing means 9, cleaning means 10, and the like, are mounted to complete the process cartridge B. The thus formed process cartridge B is removably installable into the cartridge accommodating means provided in the main assembly 14 of an image forming apparatus.

(Housing Structure of Process Cartridge B)

As described above, the housing of the process cartridge B in this embodiment is formed by joining the toner chamber frame 11, the image developing chamber frame 12, and the cleaning chamber frame 13. Next, the structure of the thus formed housing will be described.

Figure 13:
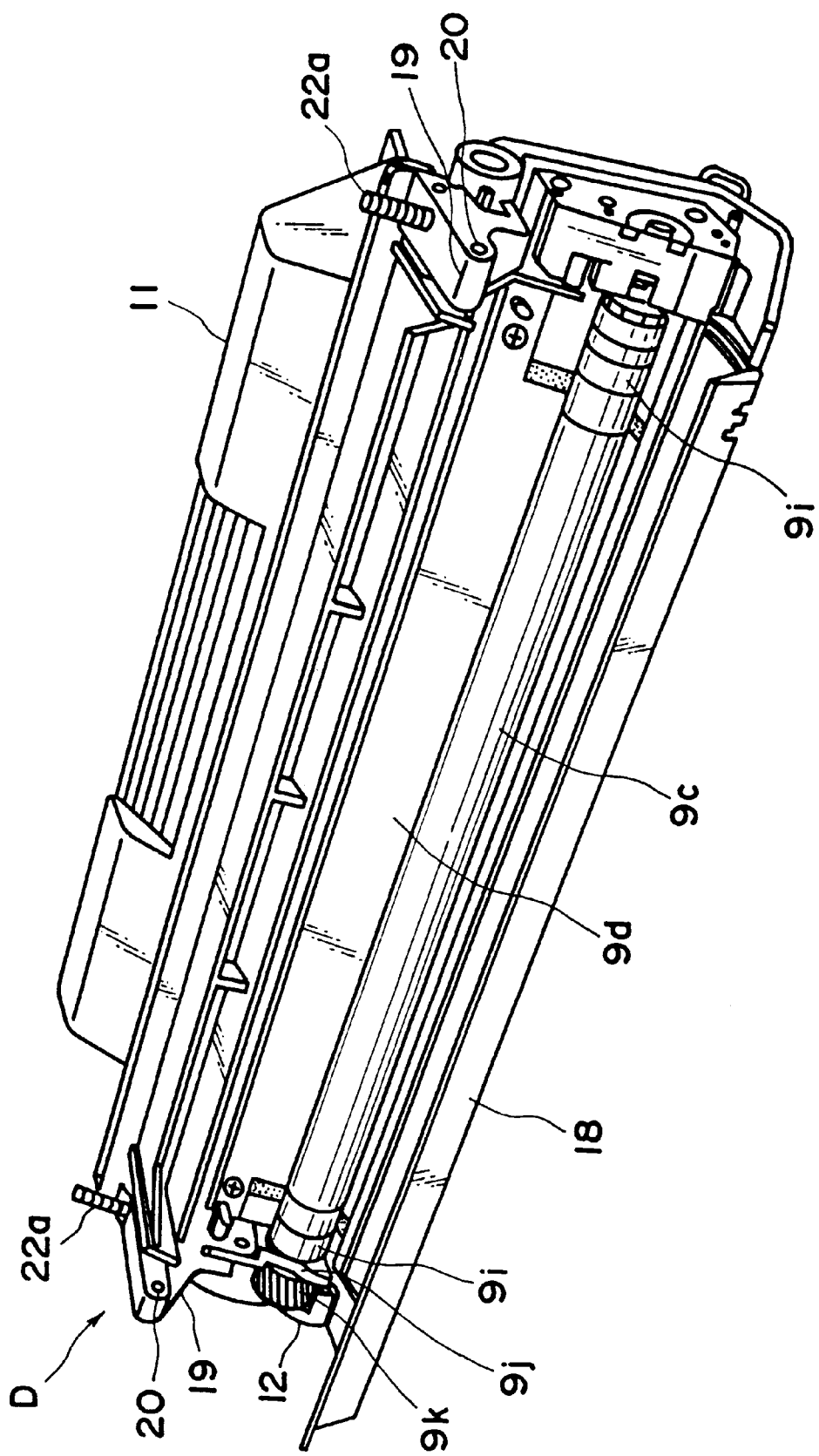
FIG. 13 is a perspective view of an image developing unit.
Figure 19:
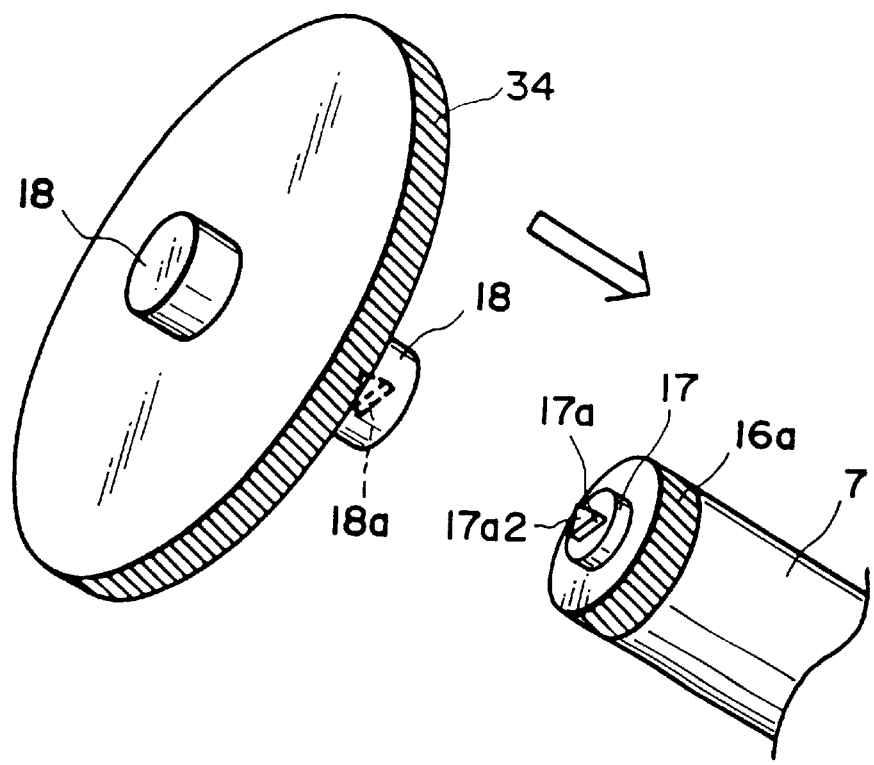
FIG. 19 is a perspective view of a shaft coupling member provided in the process cartridge and the shaft coupling member provided in the main assembly of the apparatus according to Embodiment 1 of the present invention.
Figure 20:
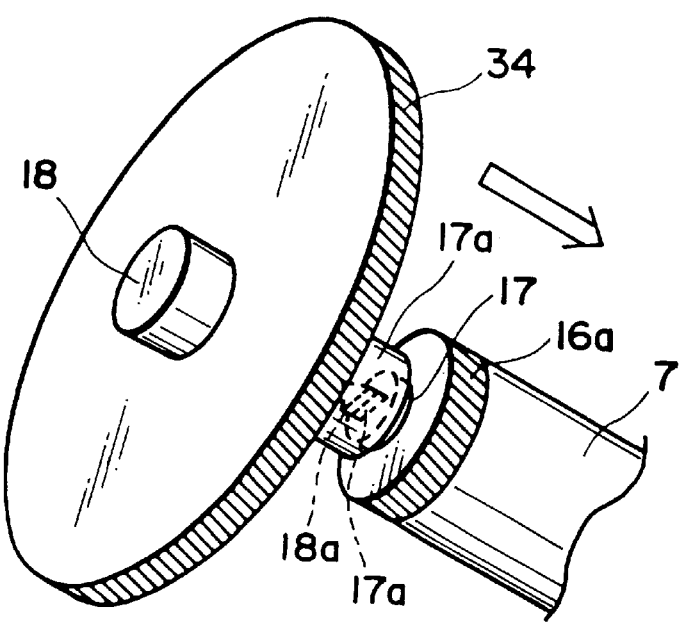
FIG. 20 is a perspective view of a coupling provided in the process cartridge and a shaft coupling member provided in the main assembly of the apparatus according to Embodiment 1 of the present invention.

Referring to FIGS. 3 and 20, in the toner chamber frame 11, the toner feeding member 9b is rotatively mounted. In the image developing chamber frame 12, the image developing roller 9c and the developing blade 9d are mounted, and adjacent to the developing roller 9c, the stirring member 9c is rotatively mounted to circulatively stir the toner within the image developing chamber. Referring to FIGS. 3 and 19, in the image developing chamber frame 12, a rod antenna 9h is mounted, extending in the lengthwise direction of the developing roller 9c substantially in parallel to the developing roller 9c. The toner chamber frame 11 and the development chamber frame 12, which are equipped in the above-described manner, are welded together (in this embodiment, by ultrasonic wave) to form a second frame which constitutes an image developing unit D (FIG. 13).

The image developing unit of the process cartridge B is provided with a drum shutter assembly 18, which covers the photosensitive drum 7 to prevent it from being exposed to light for an extend period of time or from coming in contact with foreign objects when or after the process cartridge B is removed from the main assembly 14 of an image forming apparatus.

Referring to FIG. 6, the drum shutter assembly 18 has a shutter cover 18a which covers or exposes the transfer opening 13n illustrated in FIG. 3, and linking members 18b and 18c which support the shutter cover 18. On the upstream side relative to the direction in which the recording medium 2 is conveyed, one end of the right-hand side linking member 18c is fitted in a hole 40g of a developing means gear holder 40 as shown in FIGS. 4 and 5, and one end of the left-hand side linking member 18c is fitted in a boss 11h of the bottom portion 11b of the toner chamber frame 11. The other ends of the left- and right-hand linking members 18c are attached to the corresponding lengthwise ends of the shutter cover 18a, on the upstream side relative to the recording medium conveying direction. The linking member 18c is made of metallic rod. Actually, the left- and right-hand linking members 18c are connected through the shutter cover 18a; in other words, the left- and right-hand linking members 18c are the left- and right-hand ends of a single piece linking member 18c. The linking member 18b is provided only on one lengthwise end of the shutter cover 18a. One end of the linking member 18b is attached to the shutter cover 18a, on the downstream side, relative to the recording medium conveying direction, of the position at which the linking member 18c is attached to the shutter cover 18a, and the other end of the linking member 18b is fitted around a dowel 12d of the image development chamber frame 12. The linking member 18b is formed of synthetic resin.

The linking members 18b and 18c, which are different in length, form a four piece linkage structure in conjunction with the shutter cover 18a and the toner chamber frame 11. As the process cartridge B is inserted into an image forming apparatus, the portion 18c1 of the linking member 18c, which projects away from the process cartridge B, comes in contact with the stationary contact member (unillustrated) provided on the lateral wall of the cartridge accommodating space S of the main assembly 14 of the image forming apparatus, and activates the drum shutter assembly 18 to open the shutter cover 18a.

The drum shutter assembly 18 constituted of the shutter cover 18a and the linking members 18b and 18c, is loaded with the pressure from an unillustrated torsional coil spring fitted around a dowel 12d. One end of the spring is anchored to the linking member 18b, and the other end is anchored to the image developing chamber frame 12, so that the pressure is generated in the direction to cause the shutter cover 18a to cover the transfer opening 13n.

Referring again to FIGS. 3 and 12, the cleaning means frame 13 is fitted with the photosensitive drum 7, the charging roller 8, and the various components of the cleaning means 10, to form a first frame as a cleaning unit C (FIG. 12).

Figure 12:
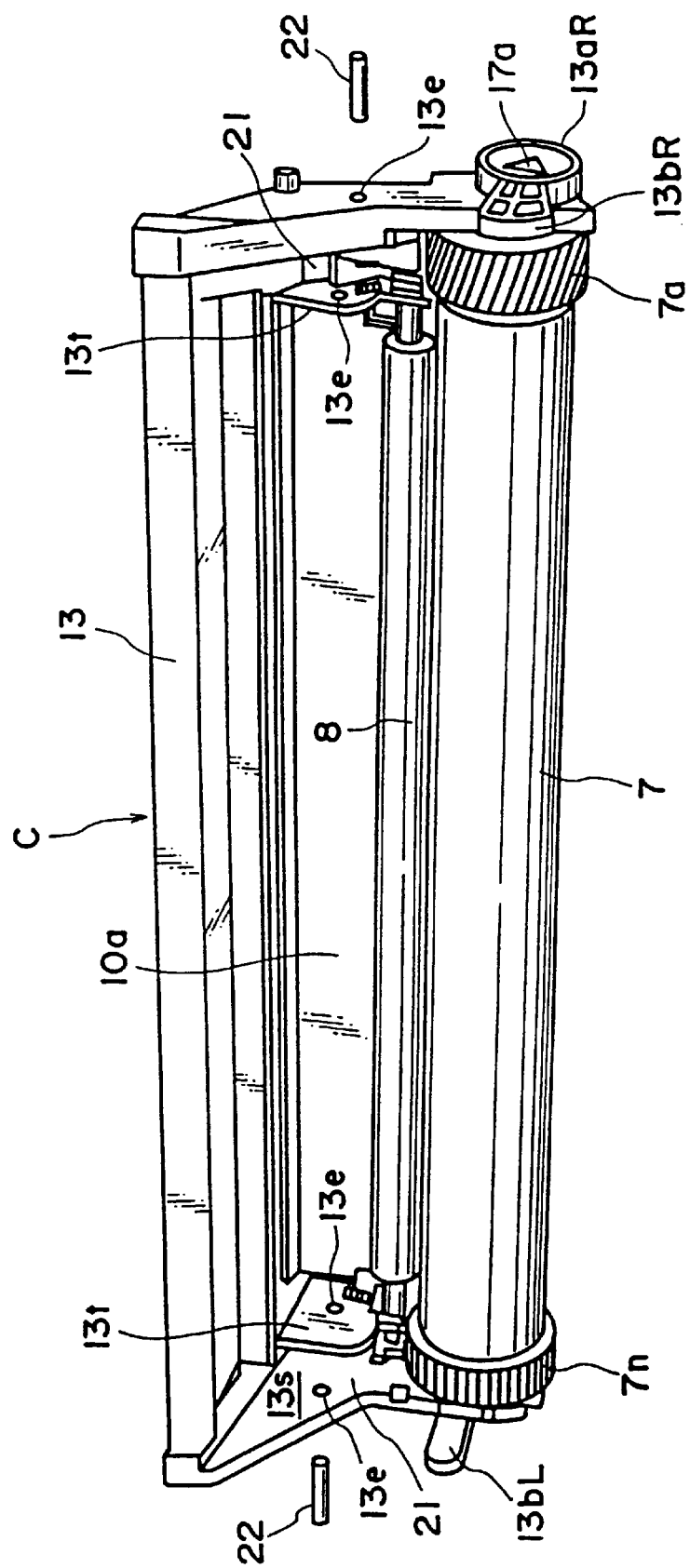
FIG. 12 is a perspective view of a cleaning unit.

Then, the aforementioned image developing unit D and cleaning unit C are joined with the use of a joining member 22, in a mutually pivotable manner, to complete the process cartridge B. More specifically, referring to FIG. 13, both lengthwise (axial direction of the developing roller 9c) ends of the image developing chamber frame 12 are provided with an arm portion 19, which is provided with a round hole 20 which is in parallel to the developing roller 9c. On the other hand, a recessed portion 21 for accommodating the arm portion 19 is provided at each lengthwise end of the cleaning chamber frame (FIG. 12). The arm portion 19 is inserted in this recessed portion 21, and the joining member 22 is pressed into the mounting hole 13e of the cleaning chamber frame 13, put through the hole 20 of the end portion of the arm portion 19, and pressed, farther, into the hole 13e of an partitioning wall 13t, so that the image developing unit D and the cleaning unit C are joined to be pivotable relative to each other about the joining member 22. In joining the image developing unit D and the cleaning unit C, a compression type coil spring 22a is placed between the two units, with one end of the coil spring being fitted around an unillustrated dowel erected from the base portion of the arm portion 19, and the other end being pressed against the top wall of the recessed portion 21 of the cleaning chamber frame 13. As a result, the image developing chamber frame 12 is pressed downward to reliably keep the developing roller 9c pressed downward toward the photosensitive drum 7. More specifically, referring to FIG. 13, a roller 9i having a diameter larger than that of the developing roller 9c is attached to each lengthwise end of the developing roller 9c, and this roller 9i is pressed on the photosensitive drum 7 to maintain a predetermined gap (approximately 300 μm) between the photosensitive drum 7 and the developing roller 9c. The top surface of the recessed portion 21 of the cleaning chamber frame 13 is slanted so that the compression type coil spring 22a is gradually compressed when the image developing unit D and the cleaning unit C are united. That is, the image developing unit D and the cleaning unit C are pivotable toward each other about the joining member 22, wherein the positional relationship (gap) between the peripheral surface of the photosensitive drum 7 and the peripheral surface of the developing roller 9c is precisely maintained by the elastic force of the compression type coil spring 22a.

Since the compression type coil spring 22a is attached to the base portion of the arm portion 19 of the image developing chamber frame 12, the elastic force of the compression type coil spring 22a affects only the base portion of the arm portion 19. In a case in which the image developing chamber frame 12 is provided with a dedicated spring mount for the compression type coil spring 22a, the adjacencies of the spring seat must be reinforced to precisely maintain the predetermined gap between the photosensitive drum 7 and the developing roller 9c. However, with the placement of the compression type coil spring 22a in the above described manner, it is unnecessary to reinforce the adjacencies of the spring seat, that is, the adjacencies of the base portion of the arm portion 19 in the case of this embodiment, because the base portion of the arm portion 19 is inherently greater in strength and rigidity.

The above described structure which holds together the cleaning chamber frame 13 and the image developing chamber frame 12 will be described later in more detail.

(Structure of Process Cartridge B Guiding Means)

Figure 9:
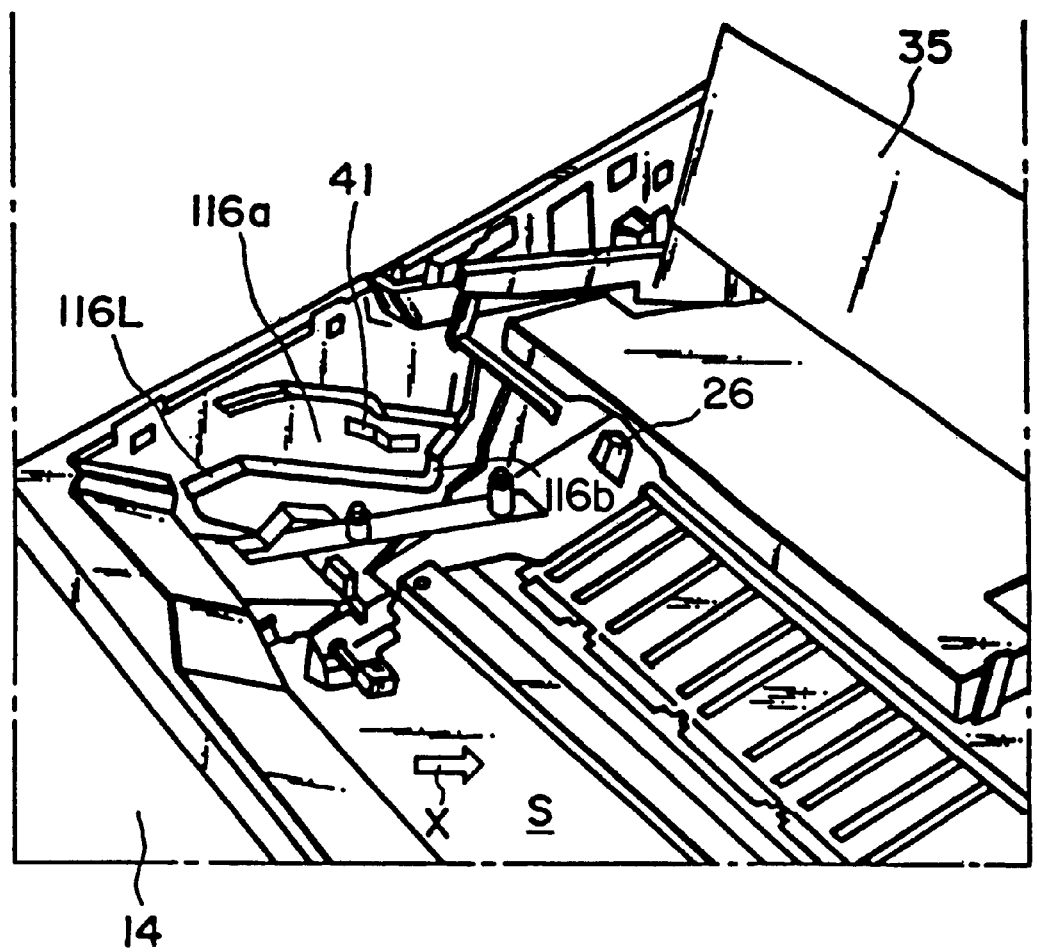
FIG. 9 is an external perspective view of the process cartridge accommodating portion of the main assembly of the apparatus illustrated in FIG. 1.
Figure 10:
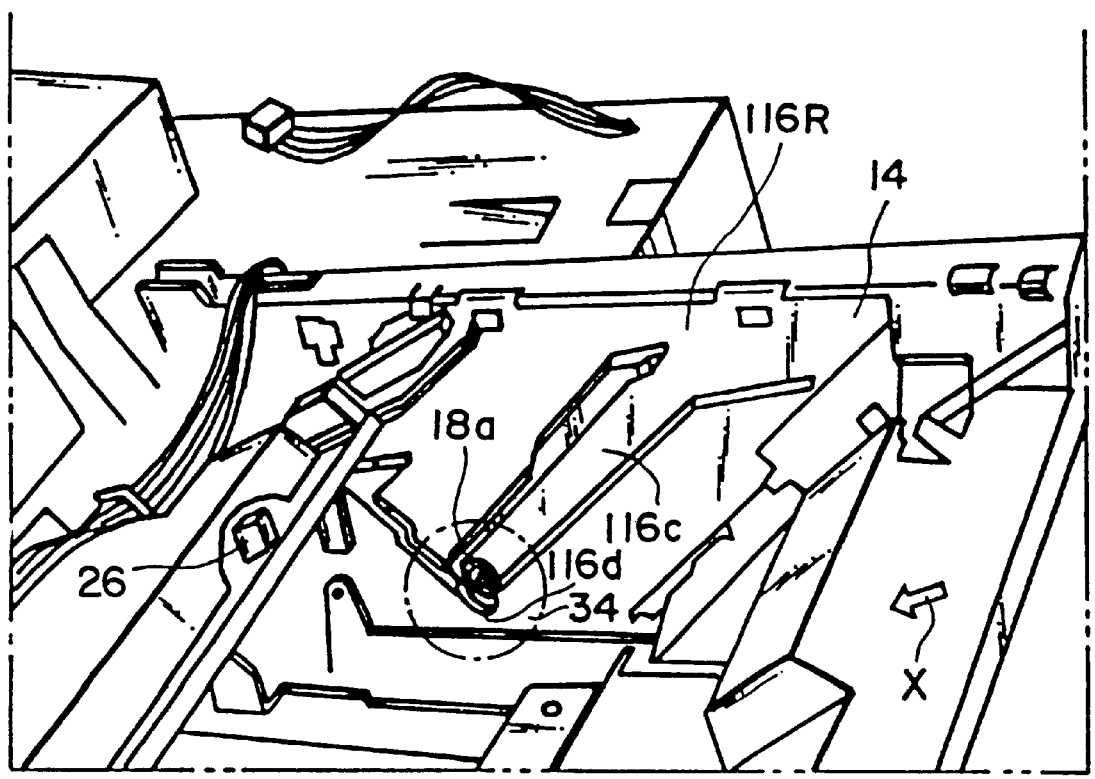
FIG. 10 is an external perspective view of the process cartridge accommodating portion of the main assembly of the apparatus illustrated in FIG. 1.

Next, the means for guiding the process cartridge B when the process cartridge B is installed into, or removed from, the main assembly 14 of an image forming apparatus will be described. This guiding means is illustrated in FIGS. 9 and 10. FIG. 9 is a perspective view of the left-hand side of the guiding means, as seen (in the direction of an arrow mark X) from the side from which the process cartridge B is installed into the main assembly 14 of the image forming apparatus A (as seen from the side of the image developing unit D side). FIG. 10 is a perspective view of the right-hand side of the same, as seen from the same side.

Referring to FIGS. 4, 5, 6 and 7, each lengthwise end of the cleaning frame portion 13 is provided with means which serves as a guide when the process cartridge B is installed into, or removed from, the apparatus main assembly 14. This guiding means is constituted of a cylindrical guides 13aR and 13aL as a cartridge positioning guiding member, and rotation controlling guides 13bR and 13bL as means for controlling the attitude of the process cartridge B when the process cartridge B is installed or removed.

As illustrated in FIG. 5, the cylindrical guide 13aR is a hollow cylindrical member. The rotation controlling guides 13bR is integrally formed together with the cylindrical guide 13aR, and radially protrudes from the peripheral surface of the cylindrical guide 13aR. The cylindrical guide 13aR is provided with a mounting flange 13aR1 which is also integral with the cylindrical guide 13aR. Thus, the cylindrical guide 13aR, the rotation controlling guide 13bR, and the mounting flange 13aR1 constitute the right-hand side guiding member 13R, which is fixed to the cleaning chamber frame 13 with small screws put through the screw holes of the mounting flange 13aR1. With the right-hand side guiding member 13R being fixed to the cleaning chamber frame 13, the rotation controlling guide 13bR extends over the lateral wall of the developing means gear holder 40 fixed to the image developing chamber frame 12.

Figure 11:
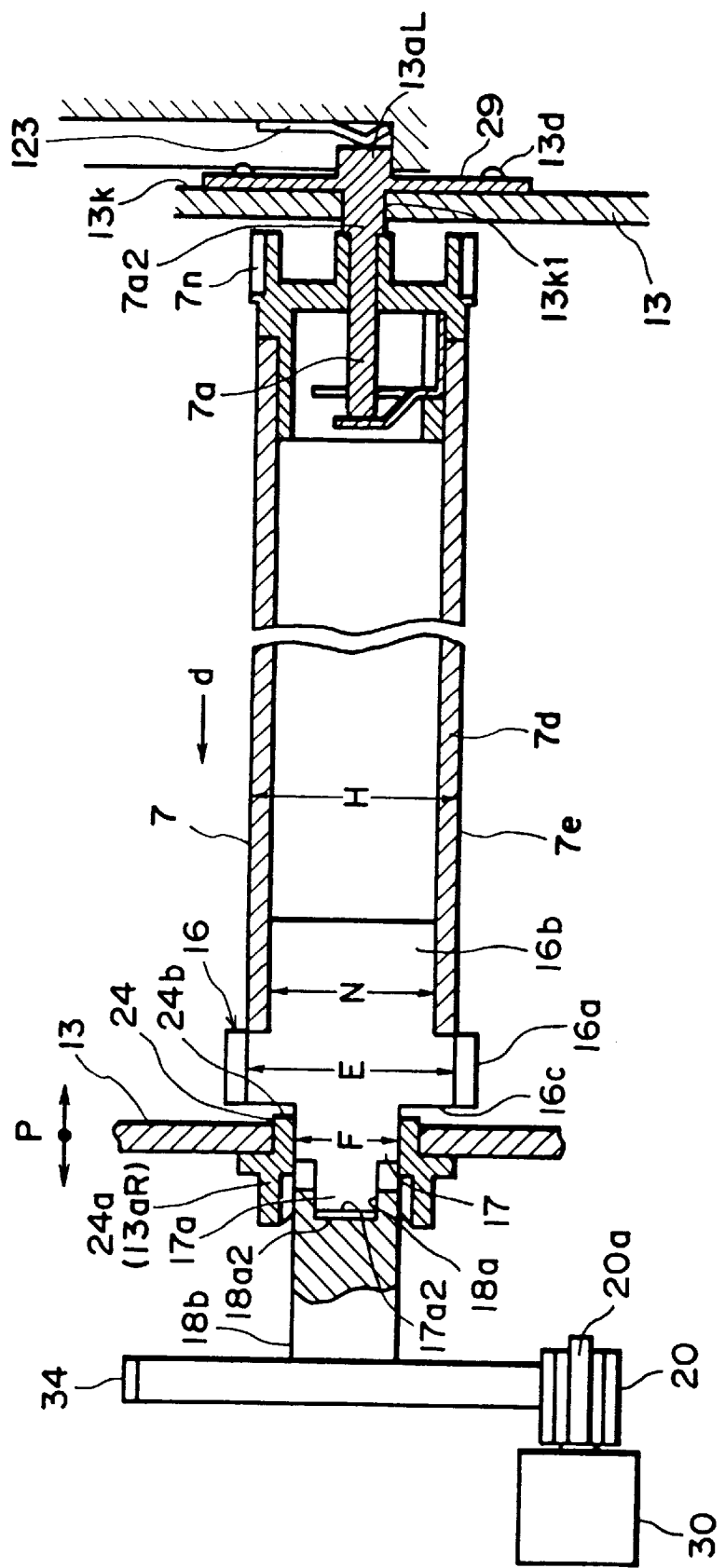
FIG. 11 is a vertical section of a photosensitive drum and a driving mechanism for driving the photosensitive drum.

Referring to FIG. 11, a drum shaft member is constituted of a drum shaft portion 7a inclusive of a larger diameter portion 7a2, a disk-shaped flange portion 29 and a cylindrical guide portion 13aL. The larger diameter portion 7a2 is fitted in the hole 13k1 of the cleaning frame portion 13. The flange portion 29 is engaged with a positioning pin 13c projecting from the side wall of the lengthwise end wall of the cleaning frame portion 13, being prevented from rotating, and is fixed to the cleaning frame portion 13 with the use of small screws 13d. The cylindrical guide 13aL projects outward (toward front, that is, the direction perpendicular to the page of FIG. 6). The aforementioned stationary drum shaft 7a which rotatively supports a spur gear 7n fitted around the photosensitive drum 7 projects inwardly from the flange 29 (FIG. 11). The cylindrical guide 13aL and the drum shaft 7a are coaxial. The flange 29, the cylindrical guide 13aL, and the drum shaft 7a, are integrally formed of metallic material such as steel.

Referring to FIG. 6, there is a rotation controlling guide 13bL slightly away from the cylindrical guide 13aL. It is long and narrow, extending substantially in the radial direction of the cylindrical guide 13aL and also projecting outward from the cleaning chamber frame 13. It is integrally formed with the cleaning chamber frame 13. In order to accommodate this rotation controlling guide 13bL, the flange 29 is provided with a cutaway portion. The distance the rotation controlling guide 13bL projects outward is such that its end surface is substantially even with the end surface of the cylindrical guide 13aL. The rotation controlling guide 13bL extends over the side wall of the developing roller bearing box 9v fixed to the image developing chamber frame 12. As is evident from the above description, the left-hand side guiding member 13L is constituted of two separate pieces: the metallic cylindrical guide 13aL and the rotation controlling guide 13bL of synthetic resin.

Next, a regulatory contact portion 13j, which is a part of the top surface of the cleaning chamber frame 13, will be described. In the following description of the regulatory contact portion 13j, "top surface" means the surface which faces upward when the process cartridge B is in the main assembly 14 of an image forming apparatus.

Referring to FIGS. 4–7, two portions 13j of the top surface 13i of the cleaning unit C, which are the portions right next to the right and left front corners 13p and 13q, relative to the direction perpendicular to the direction in which the process cartridge B is inserted, constitute the regulatory contact portions 13j, which regulate the position and attitude of the process cartridge B when the cartridge B is installed into the main assembly 14. In other words, when the process cartridge B is installed into the main assembly 14, the regulatory contact portion 13j comes in contact with the fixed contact member 25 provided in the main assembly 14 of an image forming apparatus (FIGS. 9 and 10), and regulates the rotation of the process cartridge B about the cylindrical guide 13aR and 13aL.

Next, the guiding means on the main assembly side 14 will be described. Referring to FIG. 1, as the lid 35 of the main assembly 14 of an image forming apparatus is pivotally opened about a supporting point 35a in the counterclockwise direction, the top portion of the main assembly 14 is exposed, and the process cartridge accommodating portion appears as illustrated in FIGS. 9 and 10. The left and right internal walls of the image forming apparatus main assembly 14, relative to the direction in which the process cartridge B is inserted, are provided with guide members 116L (FIG. 9) and 116R (FIG. 10), respectively, which extend diagonally downward from the side opposite to the supporting point 35a.

As shown in the drawings, the guide members 116L and 116R comprise guide portions 116a and 116c, and positioning grooves 116b and 116d connected to the guide portions 116a and 116c, respectively. The guide portions 116a and 116c extend diagonally downward, as seen from the direction indicated by an arrow mark X, that is, the direction in which the process cartridge B is inserted. The positioning grooves 116b and 116d have a semicircular cross-section which perfectly matches the cross-section of the cylindrical guides 13aL or 13aR of the process cartridge B. After the process cartridge B is completely installed in the apparatus main assembly 14, the centers of semicircular cross-sections of the positioning groove 116b and 116d coincide with the axial lines of the cylindrical guides 13aL and 13aR, respectively, of the process cartridge B, and hence, with the axial line of the photosensitive drum 7.

The width of the guide portions 16a and 16c as seen from the direction in which the process cartridge B is installed or removed is wide enough to allow the cylindrical guides 13aL and 13aR to ride on them with a reasonable amount of play. Therefore, the rotation controlling guide 13bL and 13bR which are narrower than the diameter of the cylindrical guide 13aL and 13aR naturally fit more loosely in the guide portions 116a and 116c than the cylindrical guides 13aL and 13aR, respectively, yet their rotation is controlled by the guide portions 16a and 16c. In other words, when the process cartridge B is installed, the angle of the process cartridge B is kept within a predetermined range. After the process cartridge B is installed in the image forming apparatus main assembly 14, the cylindrical guides 13aL and 13aR of the process cartridge B are in engagement with the positioning grooves 116b and 116d of the guiding members 13L and 13R, and the left and right regulatory contact portions 13j located at the front portion, relative to the cartridge inserting direction, of the cleaning chamber frame 13 of the process cartridge B, are in contact with the fixed positioning members 26, respectively.

The weight distribution of the process cartridge B is such that when the line which coincides with the axial lines of the cylindrical guide 13aL and 13aR is level, the image developing unit D side of the process cartridge B generates a larger moment about this line than the cleaning unit C side.

The process cartridge B is installed into the image forming apparatus main assembly 14 in the following manner. First, the cylindrical guides 13aL and 13aR of the process cartridge B are inserted into the guide portion 116a and 116c, respectively, of the cartridge accommodating portion in the image forming apparatus main assembly 14 by grasping the recessed portion 17 and ribbed portion 11c of the process cartridge B with one hand, and the rotation controlling guides 13bL and 13bR are also inserted into the guide portions 116a and 116c, tilting downward the front portion, relative to the inserting direction, of the process cartridge B. Then, the process cartridge B is inserted farther with the cylindrical guides 13aL and 13aR and the rotation controlling guides 13bL and 13bR of the process cartridge B following the guide portions 116a and 116c, respectively, until the cylindrical guides 13aL and 13aR reach the positioning grooves 116b and 116d of the image forming apparatus main assembly 14. Then, the cylindrical guides 13aL and 13aR become seated in the positioning grooves 116b and 116d, respectively, due to the weight of the process cartridge B itself; the cylindrical guides 13aL and 13aR of the process cartridge B are accurately positioned relative to the positioning grooves 116b and 116d. In this condition, the line which coincides with the axial lines of the cylindrical guides 13aL and 13aR also coincides with the axial line of the photosensitive drum 7, and therefore, the photosensitive drum 7 is reasonably accurately positioned relative to the image forming apparatus main assembly 14. It should be noted here that the final positioning of the photosensitive drum 7 relative to the image forming apparatus main assembly 14 occurs at the same time as the coupling between the two is completed.

Also in this condition, there is a slight gap between the stationary positioning member 26 of the image forming apparatus main assembly 14 and the regulatory contact portion 13j of the process cartridge B. At this point of time, the process cartridge B is released from the hand. Then, the process cartridge B rotates about the cylindrical guides 13aL and 13aR in the direction to lower the image developing unit D side and raise the cleaning unit C side until the regulatory contact portions 13j of the process cartridge B come in contact with the corresponding stationary positioning members 26. As a result, the process cartridge B is accurately positioned relative to the image forming apparatus main assembly 14. Thereafter, the lid 35 is closed by rotating it clockwise about the supporting point 35a.

In order to remove the process cartridge B from the apparatus main assembly 14, the above described steps are carried out in reverse. More specifically, first, the lid 35 of the apparatus main assembly 14 is opened, and the process cartridge B is pulled upward by grasping the aforementioned top and bottom ribbed portions 11c, that is, the handhold portions, of the process cartridge by hand. Then, the cylindrical guides 13aL and 13aR of the process cartridge B rotate in the positioning grooves 116b and 116d of the apparatus main assembly 14. As a result, the regulatory contact portions 13j of the process cartridge B separate from the corresponding stationary positioning member 26. Next, the process cartridge B is pulled more. Then, the cylindrical guides 13aL and 13aR come out of the positioning grooves 116b and 116d, and move into the guide portions 116a and 116c, of the guiding members 116L and 116R, respectively, fixed to the apparatus main assembly 14. In this condition, the process cartridge B is pulled more. Then, the cylindrical guides 13aL and 13aR and the rotation controlling guides 13bL and 13bR of the process cartridge B slide diagonally upward through the guide portions 116a and 116c, of the apparatus main assembly 14, with the angle of the process cartridge B being controlled so that the process cartridge B can be completely moved out of the apparatus main assembly 14 without making contact with the portions other than the guide portions 116a and 116c.

Referring to FIG. 12, the spur gear 7n is fitted around one of the lengthwise ends of the photosensitive drum 7, which is the end opposite to where the helical drum gear 7f is fitted. As the process cartridge B is inserted into the apparatus main assembly 14, the spur gear 7n meshes with a gear (unillustrated) coaxial with the image transferring roller 4 located in the apparatus main assembly, and transmits from the process cartridge B to the transferring roller 4 the driving force which rotates the transferring roller 4.

(Coupling and Driving Structure) The description will be made as to the structure of the shaft coupling apparatus which is a drive transmission mechanism from the main assembly of the image forming apparatus to the process cartridge.

Figure 14:
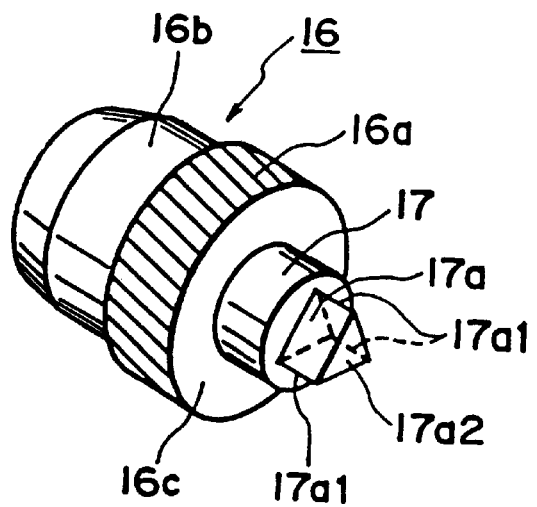
FIG. 14 is a perspective view of a drum flange (driving force transmitting part) according to a first embodiment.
Figure 15:
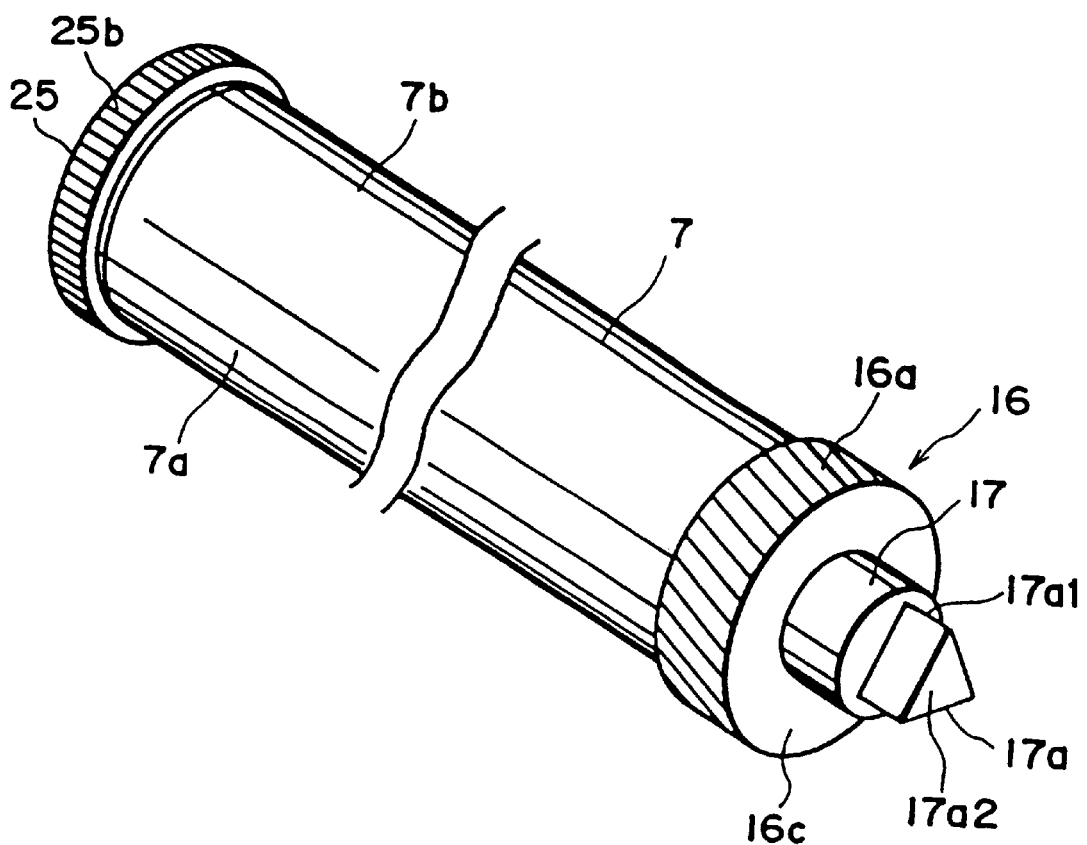
FIG. 15 is a perspective view of a photosensitive drum according to Embodiment 1 of the present invention.
Figure 16:
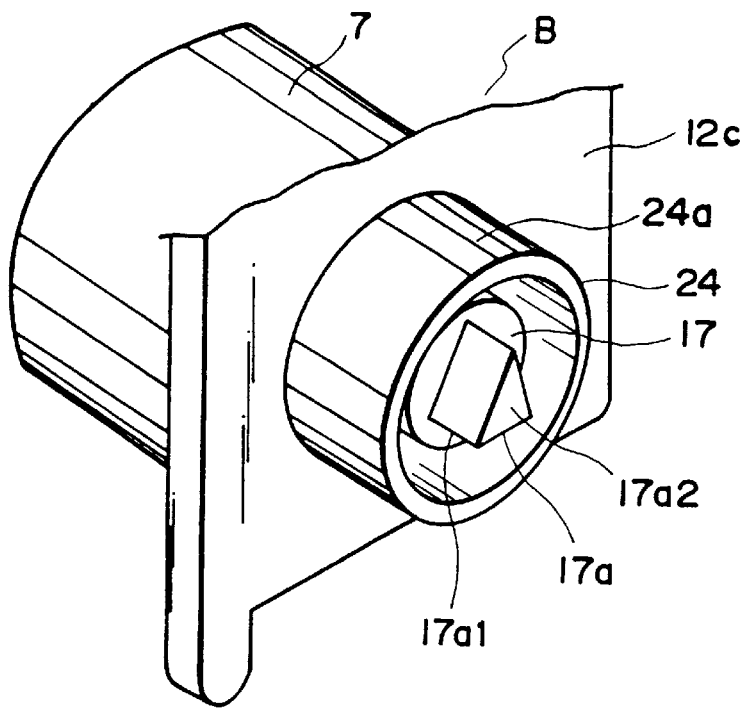
FIG. 16 is a perspective view of a side shaft coupling portion of a process cartridge according to Embodiment 1 of the present invention.
Figure 17:
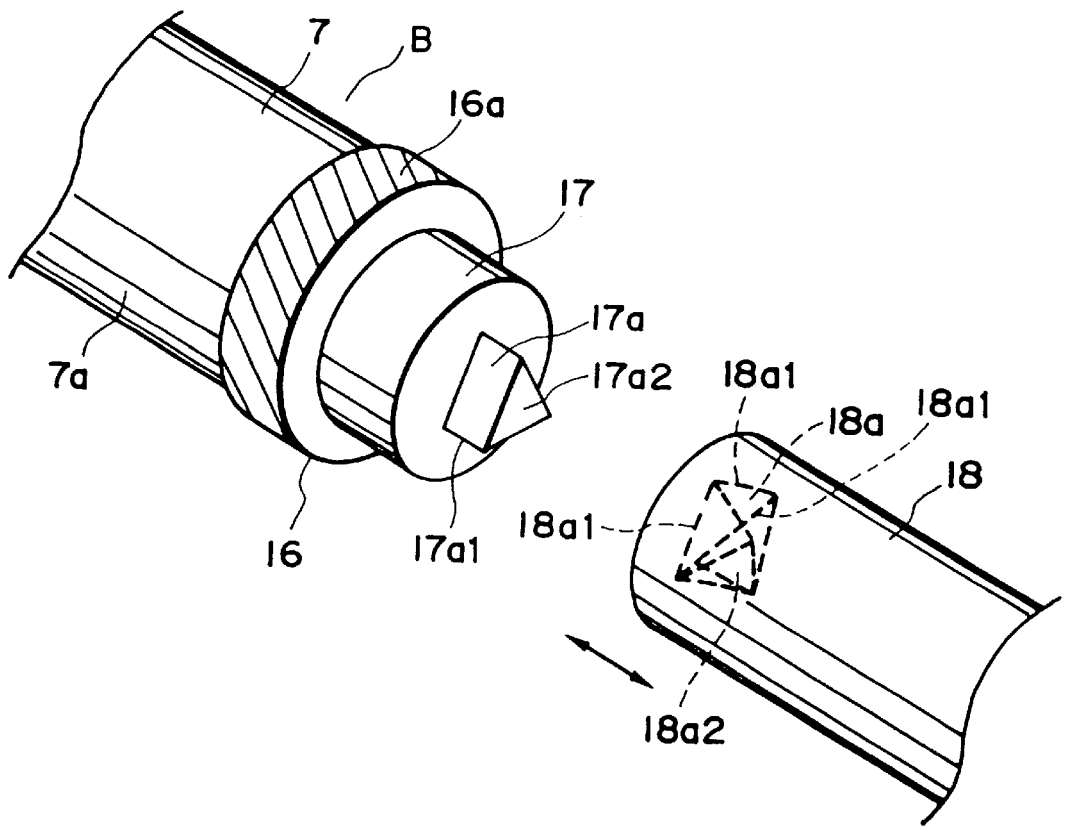
FIG. 17 is a perspective view of a shaft coupling used in the process cartridge and the main assembly of the electrophotographic image forming apparatus according to Embodiment 1 of the present invention.

FIG. 14 is a perspective view of a drum flange 16 as a driving force transmission part integral with the male coupling shaft 17; FIG. 15 is a partly sectional perspective view of the photosensitive drum 7 mounted to the drum flange 16; FIG. 16 is an enlarged perspective view around the male coupling shaft 17 of the process cartridge B shown in FIG. 11; and FIG. 17 is an illustration of a relation between the male coupling shaft 17 (provided in the process cartridge B) as the shaft coupling member and the female coupling shaft 18 (provision in the main assembly 13).

As shown in FIG. 11 and FIG. 15 to FIG. 17, a process cartridge shaft coupling means is provided at one longitudinal end of the photosensitive drum 7 mounted to the process cartridge B. The shaft coupling means is in the form of a male coupling shaft 17 (circular column configuration) on a drum flange 16 fixed to one end of the photosensitive drum 7, and has a projection 17a formed at a free end of the male coupling shaft 17. The male coupling shaft 17 is engaged in a bearing 24 and shaft reception 24a as a drum shaft. In this example, the drum flange 16, male coupling shaft 17 and the projection 17a are integrally formed. The drum flange 16 is integrally provided with a helical drum gear 16a to transmit the driving force to the developing roller 10d in the process cartridge B. Therefore, as shown in FIG. 14, the drum flange 16 is an integrally molded product of plastic resin material having a helical gear 16a, coupling male shaft 17, and the projection 17a and the engaging member 16b, which will be described hereinafter, to constitute a driving force transmitting part having a function of transmitting a driving force.

Figure 28B:
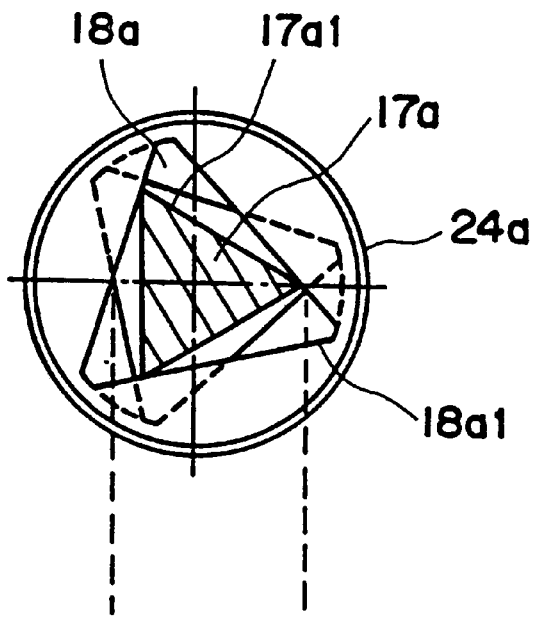
FIG. 28 is a sectional view showing a connecting state of the shaft coupling between the process cartridge and the main assembly of the apparatus.
Figure 28A:
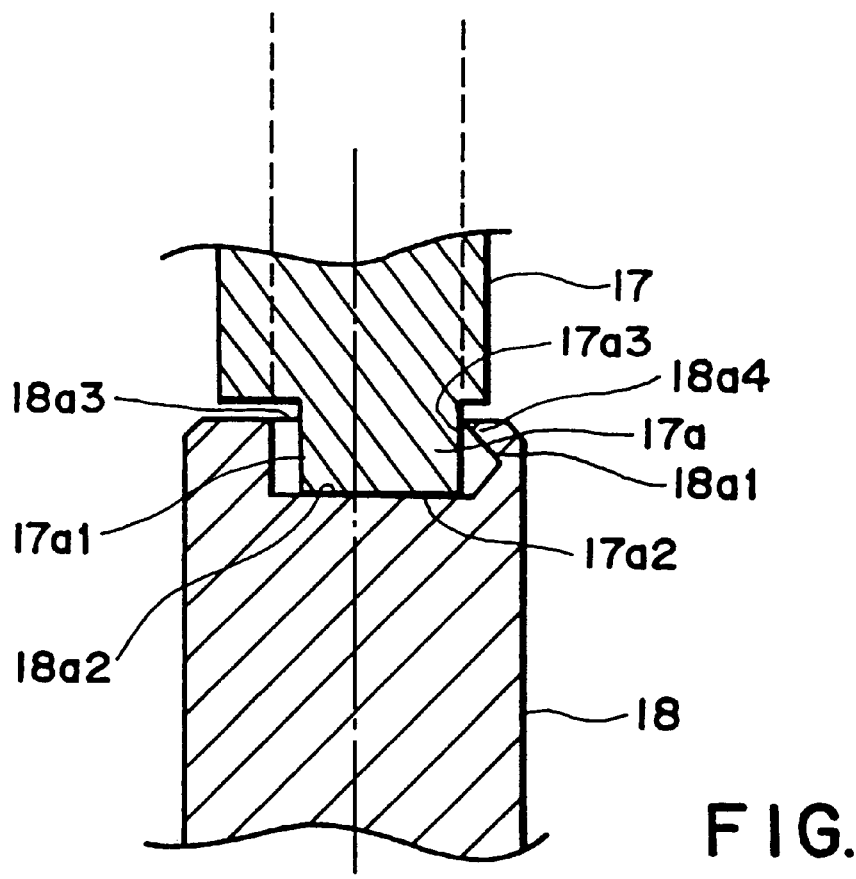

The projection 17a has a configuration of a non-twisted prism, and more particularly, it has a cross-section of a substantially equilateral triangle, and the recess 18a, engageable with the projection 17a, is a twisted hole having a section of a substantially equilateral triangle. The recess 18a rotates integrally with a large gear 34 provided in the main assembly 13 of the apparatus. With the structure of this embodiment, the process cartridge B is mounted to the main assembly 13, and the projection 17a and the recess 18a of the main assembly 13 are brought into engagement with each other. When the rotating force is transmitted from the recess 18a to the projection 17a, the edge lines of the equilateral triangular prism of the projection 17a are contacted to the edge 18a1 of the equilateral triangle of the recess 18a at the entrance. Therefore, the axes are substantially aligned (FIGS. 24, 28). As described in the foregoing, by a leaf spring 41 provided on the apparatus guiding member 15 of the main assembly 13, the process cartridge B is urged toward the driving side in the axial direction of the photosensitive drum 7. Thus, the photosensitive drum 7 integral with the projection 17a is stably and correctly positioned both in the longitudinal direction and radial direction in the main assembly 13. The leaf spring 41 is not inevitable.

The position of a cross-section of a three dimensional member is stably determined by three contact points in a plane perpendicular to the axis thereof, theoretically. When the contact positions 17a1 of the projections 17a are at apexes of a substantially equilateral triangle in the plane, and the cross-sectional configuration of the recess 18a is a substantially equilateral triangle, then the contact portions 17a1 of the projection 17a are contacted to the entrance edges 18a 1 of the equilateral triangle of the recess 18a under the same conditions. Therefore, the changes of the contact points and the rotation non-uniformity of the coupling driving due to the load variation during the rotation of the process cartridge B are minimized, thus improving the rotation accuracy of the photosensitive drum 7.

FIG. 28 shows an engagement state between the projection 17a and the recess 18a. As shown in FIG. 28, when the driving force is transmitted from the recess 18*a* to the projection 17*a*, the neighborhood 17*a*3 of the base portion of the projection 17*a* (portion closer to the shaft portion 17 than the free end 17*a*2) is contacted to the corner portion (edge) 18*a*4 of the inlet 18*a*3 of the recess 18*a*. The projection 17*a* is not contacted to the inclined surface 18*a*1 of the recess 18*a*. In this manner, the triangular prism 17*a* is engaged with the recess (hole) 18*a*, and the hole 18*a* is rotated. Then, the base portion 17*a*3 of the triangular prism 17*a* is contacted to the corner portion 18*a*4 of the entrance 18*a*3 to the hole 18*a* so that the position thereof relative to the hole is determined. Since the base portion has a strength higher than the other portion, the triangular prism (projection) does not deform. The corner portion of the triangular prism and/or the corner portion of the entrance to the hole is locally deformed so that corner portion bites into the inner surface of the hole. Therefore, the coupling between the recess and the hole is firmer. The advantageous effects are remarkable when the coupling parts are of plastic resin material.

The male coupling shaft 17 and the projection 17*a* are provided on the drum flange 16 such that when the drum flange 16 is mounted to one end of the photosensitive drum 7, they are coaxial with the photosensitive drum 7. Designated by 16B is an engaging portion, engageable with the inner surface of the drum cylinder 7*a*. The fixing of the drum flange 16 to the photosensitive drum 7, may be accomplished by crimping or bonding. The circumference of the drum cylinder 7*a* is coated with a photosensitive layer 7*b* (FIGS. 11 and 15).

A drum flange 25 is fixed to the other side of the photosensitive drum 7. A spur gear 25*b* is integrally molded with the drum flange 25. The drum flange 25 is rotatably engaged with the drum shaft 7*d* integral with the flange 29 fixed to the cleaning frame 12*c*.

When the process cartridge B is mounted to the main assembly 13, the cylindrical guide 13*a*L coaxial with the drum shaft 7*d* is engaged with the U shaped groove 116*b* (FIG. 9) of the main assembly 14 and is correctly positioned, and the spur gear 25*b* molded integrally with the drum flange 25 is engaged with a gear (unshown) for transmitting the driving force to the transfer roller 4.

Around the projection 17*a* of the male coupling shaft 17 of the process cartridge B, there is provided a hollow cylindrical boss 24*a* concentric with the male shaft 17 in the cleaning frame 12*c* (FIGS. 4, 11 and 16). When the process cartridge B is mounted to or demounted from the main assembly, the male coupling projection 17*a* is protected by the boss 24*a*, and therefore, the liability of damage thereto or deformation thereof is reduced. Thus, the vibration or wobbles during the coupling driving operation due to the damage of the projection 17*a*, can be avoided.

Examples of the material of the drum flanges 16 and 25, the shaft 17 and the projection 17*a* include polyacetal, polycarbonate, polyamide, polybutyleneterephthalate or another resin material. Other materials are usable and can be selected properly by one skilled in the art.

The boss 24*a* also functions as a cylindrical guide 13*a*R for the process cartridge B when it is mounted to the main assembly 14. When the process cartridge B is mounted to the main assembly, the boss 24*a* and the main assembly side guide portion 15*c* are abutted, and the boss 24*a* functions as a guiding member for the mounting of the process cartridge B to the mounting position, thus facilitating the mounting-and-demounting of the process cartridge B relative to the main assembly 13 of the apparatus. When the process cartridge B has been mounted to the mounting position, said boss 24*a* is supported by the U groove 16*d* which is a recess provided in the guide portion 116*c*. When the male coupling shaft 17 and the female shaft 18 are aligned axially by the driving force applied upon the image forming operation, the boss 24*a* is slightly raised from the groove 15*d* (approx. 0.3–1.0), wherein the gap between the boss 24*a* and the main assembly guide portion 15*c* (U groove 15*d*) is smaller than the radial gap between the male coupling projection 17*a* and the recess 18*a*. Therefore, the engagement between the male coupling projection 17*a* and the recess 18*a* is enabled in the state in which the process cartridge B is mounted to the process cartridge B. A recess 18*a* is provided at a rear part of the groove 16*d*. The configuration of the boss 24*a* is not limited to the cylindrical shape of this embodiment, and it is not inevitably complete cylindrical but may be part-cylindrical provided that it can be guided by the guide portion 116*c* and can be supported by the groove 16*d*. In this embodiment, the cylindrical boss 24*a* and the bearing 24 for rotatably supporting the male coupling shaft 17 are integrally molded, and it is threaded (unshown) to the cleaning frame 12*c*(FIG. 11), but this is not inevitable, and the bearing 24 and boss 24*a* may be separate members.

In this embodiment, the drum flange 25 is engaged with the drum shaft 7*d* provided in the cleaning frame 12*c* (FIG. 11), and the male coupling shaft 17 is engaged with the inner surface of the bearing 24 provided in the cleaning frame 12*c*; and in this state, the photosensitive drum 7 is mounted to the cleaning frame 12*c* of the process cartridge B. Then, the photosensitive drum 7 is rotated about the drum shaft 7*d* and the male coupling shaft 17. In this embodiment, the photosensitive drum 7 is mounted, for axial movement, to the cleaning frame 12*c*. This is done in consideration of the mounting tolerance. This is not inevitable, and the photosensitive drum 7 may be immovable in the axial direction (for example, the positioning of the photosensitive drum in the axial direction, which will be described hereinafter is usable).

Figure 18:
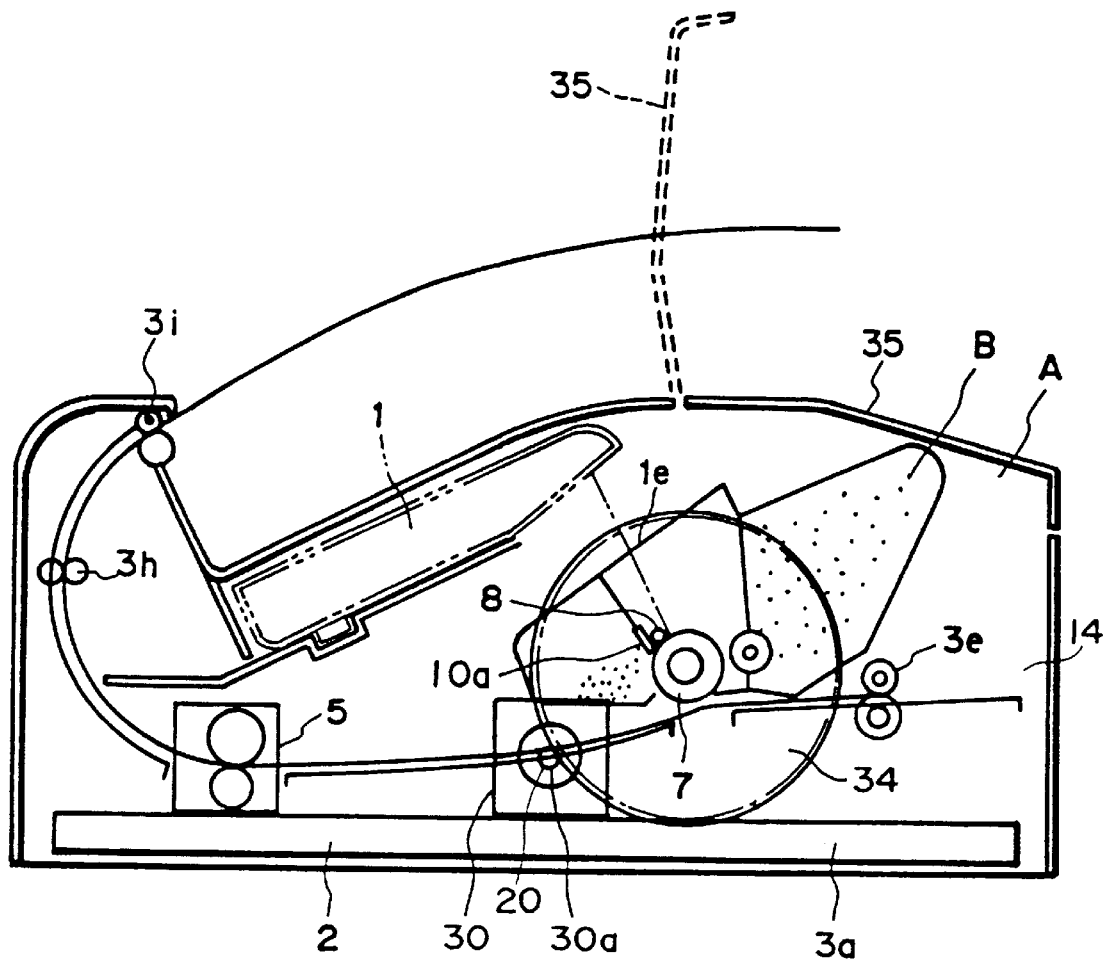
FIG. 18 is a cross-sectional view of a driving system provided in the main assembly of the electrophotographic image forming apparatus according to Embodiment 1 of the present invention.

On the other hand, the main assembly 14 of the image forming apparatus is provided with a main assembly side shaft coupling apparatus. The main assembly side shaft coupling apparatus has a female coupling shaft 18 (circular column configuration) at a position where the axis of the photosensitive drum and the rotation axis are coaxial when it is in engagement with the process cartridge side shaft coupling member and is rotated. The female coupling shaft 18, as shown in FIGS. 11 and 18, is integral with the large gear 34 for transmitting the driving force from the motor 30 to the photosensitive drum 7. The female coupling shaft 18 is projected from a lateral end of the large gear 34 at the center of rotation of the large gear 34. In this embodiment, the large gear 34 and the female coupling shaft 18 are integrally produced by a mold.

The large gear 34 provided in the main assembly 13 is a helical gear. When the helical gear receives the driving force from the small gear 20 in the form of a helical fixed to the shaft 30*a* of the motor 30 shown in FIGS. 11, 18, a thrust force tending to move the female coupling shaft 18 toward the male shaft 17 is produced due to the inclination direction and the angle of the teeth. Thus, when the motor 30 is driven for image formation, the female coupling shaft 18 is moved toward the male shaft 17 also by the thrust to assist the engagement between the recess 18*a* and the projection 17*a*. The recess 18*a* is formed at the free end of the female coupling shaft 18 and at the center of rotation of the female coupling shaft 18.

In this embodiment, the driving force is transmitted directly from the small gear 20 fixed to the motor shaft 30*a* to the large gear 34, but this is not inevitable, and the use may be made with a gear train to effect reduced speed drive transmission, a pair of friction rollers, a combination of a timing belt and a pulley, or the like.

(Interrelating Device Between Openable Cover and Shaft Coupling)

Figure 21:
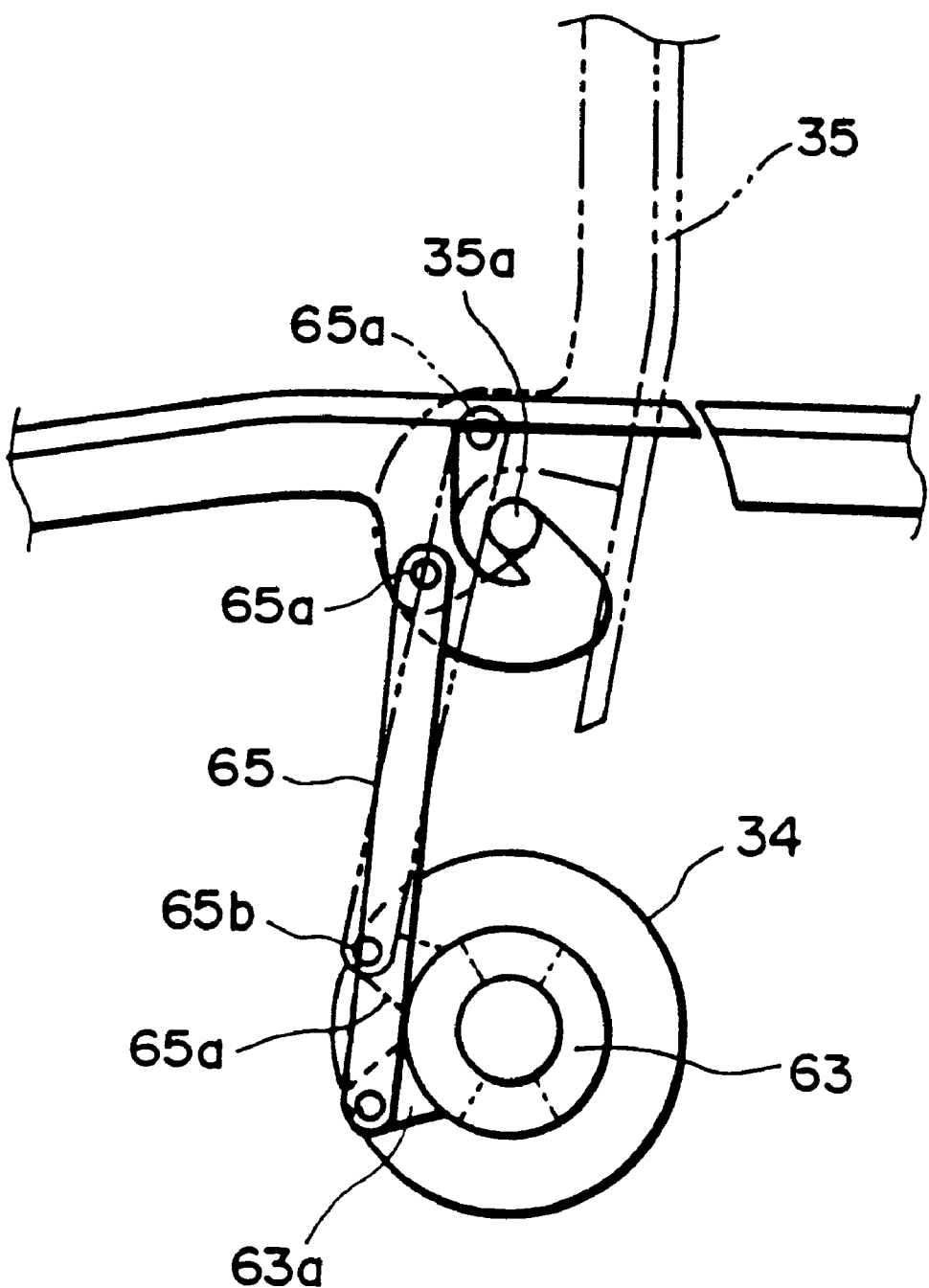
FIG. 21 is a longitudinal sectional view of a coupling portion and a cover of the main assembly of the apparatus according to Embodiment 1 of the present invention.
Figure 22:
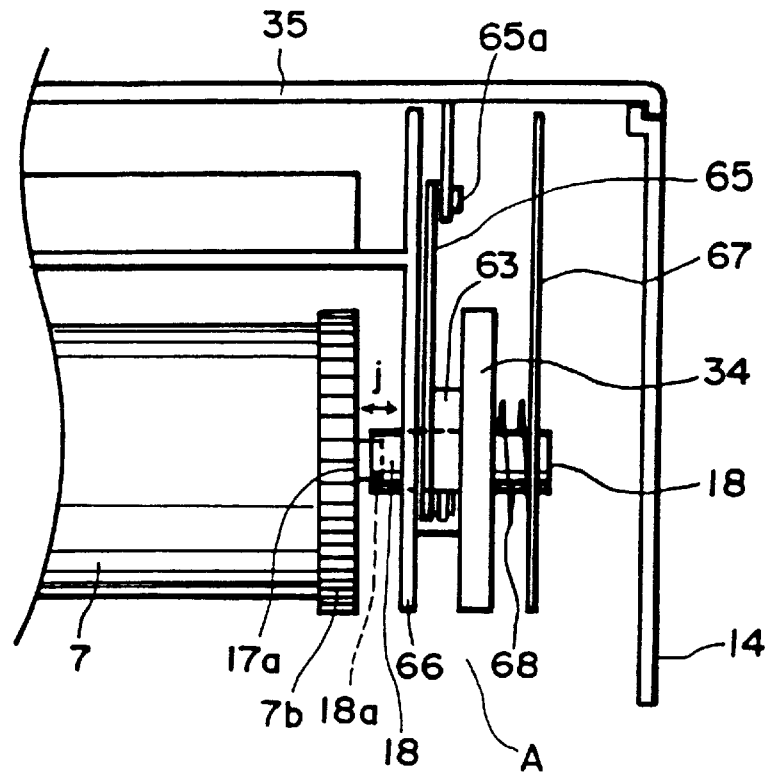
FIG. 22 is a side view of a structure of a female coupling shaft according to an embodiment of the present invention.
Figure 23:
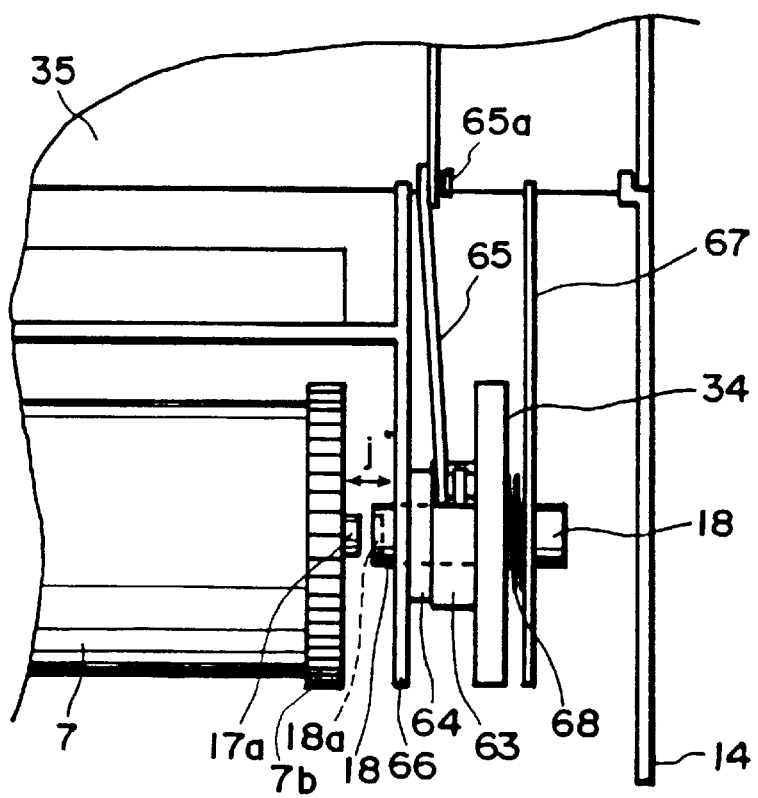
FIG. 23 is a side view showing the structure around the female coupling shaft when the process cartridge is mounted to or demounted from the main assembly of the apparatus according to Embodiment 1 of the present invention.

Referring to FIGS. 21 to 23, a structure for engaging the recess 18a and the projection 17a in interrelation with closing operation of the openable cover 35 is shown.

As shown in FIG. 23, the larger gear 34 is between the a side plate 66 and the side plate 67 in the main assembly 14, and the female coupling shaft 18 coaxially integral with the large gear 34 is rotatably supported by the side plates 67 and 66. An outer cam 63 and an inner cam 64 are closely inserted into between the large gear 34 and the side plate 66. The inner cam 64 is fixed to the side plate 66, and the outer cam 63 is rotatably engaged with the female coupling shaft 18. The surfaces of the outer cam 63 and the inner cam 64 which are substantially perpendicular to the axial direction and which are faced to each other, are cam surfaces, and are screw surfaces coaxial with the female coupling shaft 18 and are contacted to each other. Between the large gear 34 and the side plate 67, a compression coil spring 68 is compressed and fitted around the female coupling shaft 18.

As shown in FIG. 21, an arm 63a is extended from an outer periphery of the outer cam 63 in a radial direction, and an end of the arm 63a is coupled with an end of a link 65 by pins 65a and 65b at a position opposite from the opening side when the openable cover 35 is closed.

FIG. 22 is a view as seen from the right side in FIG. 21. When the openable cover 35 is closed, the link 65, outer cam 65a and the like are at the positions shown in the Figure, where the male coupling projection 17a and the recess 18a are engaged so that driving force can be transmitted from the large gear 34 to the photosensitive drum 7. When the openable cover 35 is opened, the pin 65A is rotated upward about the shaft 35a, so that arm 63a is pulled up through the link 65, and the outer cam 63 is rotated; thus, relative sliding motion is caused between the outer cam 63 and the inner cam 64 to move the large gear 34 away from the photosensitive drum 7. At this time, the large gear 34 is pushed by the outer cam 63, and is moved against the compression coil spring 68 mounted between the side plate 67 and the large gear 34, by which the female coupling recess 18a is disengaged from the male coupling projection 17a as shown in FIG. 23 to release the coupling to bring the process cartridge B into demountable state.

On the contrary, when the openable cover 35 is closed, the pin 65A connecting the link 65 with the openable cover 35, is rotated downward about the shaft 35a. The link 65 is moved downward to push the arm 63A down, so that outer cam 63 is rotated in the opposite direction and is pushed by the compression coil spring 68. By this, the large gear 34 is moved to the left by the spring 68 from a position shown in FIG. 23 to a position shown in FIG. 22, so that large gear 34 is set again at a position of FIG. 22, and the female coupling recess 18a is engaged with the male coupling projection 17a to re-establish a drive transmittable state. Thus, the demountable state and the drive transmittable state of the process cartridge B are established in response to opening and closing of the openable cover 35. When the outer cam 63 is rotated in the opposite direction by the closing of the openable cover 35 to move the large gear 34 to the left from the position of FIG. 23, the female coupling shaft 18 and the end surface of the male coupling shaft 17 may be abutted to each other so that male coupling projection 17a and the female coupling recess 18a may not be engaged with each other. However, they will be brought into engagement as soon as starting of the image forming apparatus A, as will be described hereinafter.

Thus, in this embodiment, when the process cartridge B is mounted to or demounted from the main assembly 14 of the apparatus, the openable cover 35 is opened. In interrelation with the opening and closing of the openable cover 35, the female coupling recess 18a is moved in the horizontal direction (the direction of arrow j). When the process cartridge B is mounted to or demounted from the main assembly 14, the coupling (17a, 18a) of the main assembly 14 and the process cartridge B are not to be engaged. And, they should not be engaged. Thus, the mounting-and-demounting of the process cartridge B relative to the main assembly 14 can be carried out smoothly. In this example, the female coupling recess 18a is urged toward the process cartridge B by the large gear 34 being urged by the compression coil spring 68. When the male coupling projection 17a and the recess 18a are to be brought into engagement, they may be abutted to each other, and therefore, they are not properly engaged. When, however, the motor 30 is first rotated after the process cartridge B is mounted to the main assembly 14, the female coupling recess 18a is rotated, by which they are instantaneously brought into engagement.

(Male Coupling Shaft and Female Shaft)

The function of the projection 17a and the recess 18a in the shaft coupling mechanism, will be described.

The female coupling shaft 18 provided in the main assembly 14 is supported so as to be movable in the axial direction but not in the radial direction. The process cartridge B is mounted to the main assembly 14 for movement in the radial direction of the photosensitive drum 7.

When the process cartridge B is mounted to the main assembly 13 of the apparatus, a cylindrical guide 13aL coaxial with the drum shaft 7d (FIG. 11) supporting the drum flange 25 mounted to the other longitudinal end of the photosensitive drum 7, enters the U groove 116d (FIG. 9) in the receptor portion of the main assembly 14 without gap and is correctly positioned, and the spur gear 25b molded integrally with the drum flange 25 is brought into meshing engagement with a gear (unshown) for transmitting the driving force to the transfer roller 4. On the other hand, at one longitudinal end (driving side) of the photosensitive drum 7, a boss 24a formed on the cleaning frame 13, is supported by U groove 116d provided in the main assembly 14.

By closing the openable cover 35, the female coupling shaft 18 moves toward the male coupling shaft 17, and if the phases are aligned between the projection 17a and the recess 18a, the recess 18a engages with the projection 17a in the axial direction. At this time, if the phases are not aligned, the end surface 17a2 of the male coupling shaft 17 abuts the end surface of the female coupling shaft 18 and is pushed by the spring force of the compression coil spring 68.

Then, the driving side shaft coupling member operates as follows.

When the driving motor 30 is rotated, the female coupling shaft 18 is advanced by the spring force of the compression coil spring 68 when the phases are aligned between the projection 17a and the recess 18a (the phase alignment is reached at each 120° rotation in this embodiment), so that they are engaged with each other, and the rotating force is transmitted from the main assembly 14 to the process cartridge B.

Figure 24A:
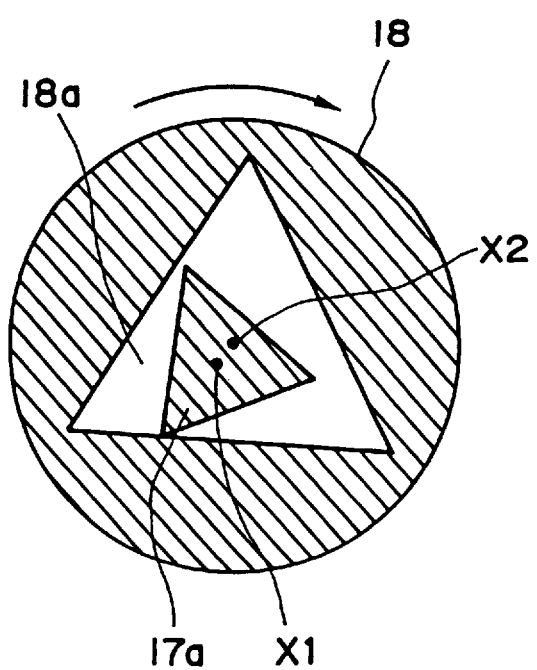
FIGS. 24(a) and 24(b) a sectional view taken along a plane perpendicular to the axis of the male coupling projection and recess according to Embodiment 1 of the present invention.
Figure 24B:
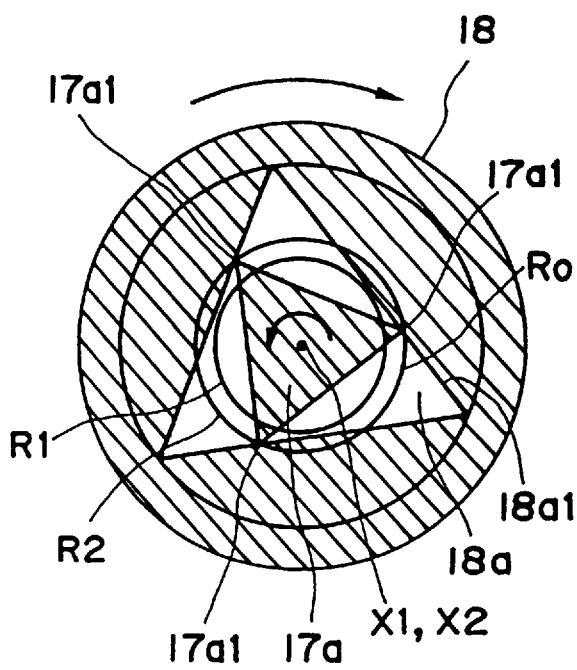

The projection 17a smoothly enters the recess 18a upon the engagement of the shaft coupling with a gap, because the section of the recess 18a (substantially equilateral triangle) is larger than the projection 17a, as shown in FIG. 24(a).

Thus, static positioning accuracy between the male coupling shaft 17 and the female coupling shaft 18 is not required to be strict, but may be rough.

In this embodiment, the projection length of the above-described cylindrical boss 24a is larger than the projection length of the projection 17a (FIG. 11). When the projection 17a and the recess 18a are engaged, the inner surface of the cylindrical boss 24a is engaged with the outer peripheral surface of the female coupling shaft 18 to function as a guide for the engagement therebetween.

When the female coupling shaft 18 is rotated after the projection 17a enters the recess 18a, upon the image formation, the edge 18a1 at the entrance of the recess 18a and the contact portion 17a1 of the projection 17a are abutted to permit driving force transmission. At this time, the male coupling shaft 17 moves instantaneously so that edge 18a1 at the entrance of the recess 18a and the contact portion 17a1 of the projection 17a are contacted uniformly (from the state shown in FIG. 24(a) to the state shown in FIG. 24(b). Since the contact portion 17a1 exists at each of apex points of a substantially equilateral triangle configuration, the male coupling shaft 17 and the female shaft 18 become coaxial when the contact force becomes substantially uniform. More particularly, immediately after the projection 17a enters the recess 18a, the center X1 of the projection 17a and the center X2 of the recess 18a are not aligned (FIG. 24(A). When the recess 18a starts to rotate, the inner side thereof is contacted to the three contact portions 17a1 of the projection 17a, then the centers X1, X2 are substantially aligned (FIG. 24(B).

With such a structure, an automatic axial alignment is carried out between the male coupling shaft 17 and the female shaft 18 upon the operation of the motor 30. By the transmission of the driving force to the photosensitive drum 7, a rotating force is applied to the process cartridge B. By this, an abutment (portion) 13j (FIGS. 4, 7) provided at an upper surface of the cleaning frame 13 of the process cartridge B is abutted to an abutment portion 26 (FIGS. 9, 10) fixedly provided in the main assembly 14, so that process cartridge B is correctly positioned relative to the main assembly 14.

When the driving force is not transmitted (when the image forming operation is not carried out), a gap is produced between the image forming apparatus and the recess 18a in the radial direction, the engagement and disengagement of the shaft coupling and the mounting-and-demounting of the process cartridge B relative to the main assembly 14 are easy. When the driving is effected, the urging force is provided with stabilization, so that play or vibration there can be suppressed.

In this embodiment, the male coupling projection and recess have substantially equilateral triangle shapes, but the same effects can be provided when they are substantially regular polygonal configuration, and the projection has contact points corresponding to the configuration of the female coupling recess. Substantially regular polygonal configuration is desirable since then the positioning can be effected with high precision, but this is not limiting, and another polygonal shape is usable if configuration is such that axial alignment is established with axial force.

When the male coupling projection and the recess are compared, the projection is naturally easily damaged and the strength of the projection is poorer than the recess. In view of this, this embodiment is such that male coupling projection is provided in the exchangeable process cartridge B, and the female coupling recess is provided in the main assembly 14 of the image forming apparatus which is required to have a higher durability than the process cartridge.

Taking a process cartridge B as an example, this embodiment is summarized as follows. The process cartridge B is detachably mountable relative to a main assembly 14 of an electrophotographic image forming apparatus A for forming an image of a recording material 2, said apparatus comprising a motor 30, a large gear 34 for receiving driving force from the motor 30, a recess 18a in the form of a hole of prism configuration integrally rotatable with the large gear 34, said hole being at the center portion of the large gear 34. Said process cartridge B includes an electrophotographic photosensitive drum 7, process means actable on the electrophotographic photosensitive drum 7 (charging roller 8, developing roller 10d cleaning blade 11a), a projection 17a engageable with the recess 18a and contactable to an inner surface thereof, wherein when the process cartridge B is mounted to the main assembly 14 of the apparatus, and the large gear 34 is rotated with the process cartridge B being in engagement with the recess 18a, the rotating force is transmitted from the large gear 34 to the electrophotographic photosensitive drum 7 with the male coupling shaft 17 and the female shaft 18 being substantially axially aligned.

The projection 17a is projected from a free end of a male coupling shaft 17 projected outwardly from the center of rotation of the photosensitive drum 7 in the longitudinal direction of the photosensitive drum 7. Here, the male coupling shaft 17 functions to rotatably support the photosensitive drum 7 on the cleaning frame 12c.

The male coupling shaft 17 is provided at the center of the helical gear 16a on one side of the gear, and opposite side of the helical gear 16a is provided with an engaging portion 16b for engagement with an inner surface of the electrophotographic photosensitive drum 7. The projection 17a, male coupling projection 17, helical gear 16a and the engaging portion 16b are integrally molded from a resin material.

There is provided a cylindrical boss 24a enclosing the projection 17a or an arcuate configuration boss extended along a part of the projection 17a. The boss 24a functions to impart a relative movement between the recess 18a and the projection 17a to function as a cylindrical guide 9aR for the engagement therebetween.

More specific embodiments will be described. The module of the large gear 34 of the main assembly 14 of the apparatus is 0.4–0.7. The dedendum diameter of the large gear 34 is approx. 30 mm–150 mm, and the teeth number of the large gear 34 is approx. 40–400. The figures may be properly selected by one skilled in the art in consideration of the space in the main assembly 14, the desired quality of the image. The figures are not limiting. In this embodiment, the module of the large gear 34 is 0.5, the dedendum diameter is approx. 100, and the teeth number is 200.

The positioning of the process cartridge B relative to the main assembly 14 during the image formation (driving transmission) is summarized as follows.

The process cartridge B is positioned in the longitudinal direction by the engagement of the cartridge frame to the cartridge mounting portion of the main assembly 14 when it is mounted to the main assembly 14. In the perpendicular direction, the cylindrical guide 13AL is snugly fitted in the U groove 116b so that it is correctly positioned in that direction. On the other hand, the boss 24a is simply supported in the U groove 116b in the receptor portion. During the image formation operation, (drive transmission), the process cartridge B is positioned such that projection 17a and the recess 18a are engaged with each other and are axially aligned. At this time, the boss 24a is away from the groove 116d. When the openable cover 35 of the main assembly is closed, the female coupling shaft 18 is moved toward the male shaft 17. When the main assembly motor 30 is rotated, the projection 17*a* and the recess 18*a* are engaged with axial alignment therebetween, and in the axial direction, the process cartridge B is positioned by the U groove 116*d* at one end of the photosensitive drum 7 and by a rotating recess 18*a* at the other end. The photosensitive drum 7 is movable in its longitudinal direction (by approx. 0.1 mm–1.0 mm) in consideration of an assembling tolerance. When the photosensitive drum 7 is supported for longitudinal movement, the axial direction thereof is determinated relative to the cleaning frame 12*c*, as described in the foregoing. The process cartridge B is mounted to the main assembly, for movement (by approx. 0.1 mm–3 mm) relative to a plate (mounting guide portions 15*a*, 15*c*) of the main assembly in view of the assembling tolerance, and is moved in the radial direction of the photosensitive drum 7.

During the image formation operation, the process cartridge B receives a rotational force in the rotational direction of the photosensitive drum 7, by which the abutment portion 13*j* of the process cartridge B is abutted to a fixing member 26 functioning as an abutment in the main assembly 14.

Accordingly, the process cartridge B is correctly positioned relative to the main assembly 14 of the apparatus in both the longitudinal direction and the radial direction during the image formation operation.

(Positioning of Process Cartridge in the Longitudinal Direction)

Referring to FIGS. 7, 9, 30 and 31, the description will be made as to a structure for further stably and further accurately positioning the process cartridge in the longitudinal direction of the photosensitive drum 7 when the process cartridge B is mounted to the main assembly of the apparatus.

Figure 30:
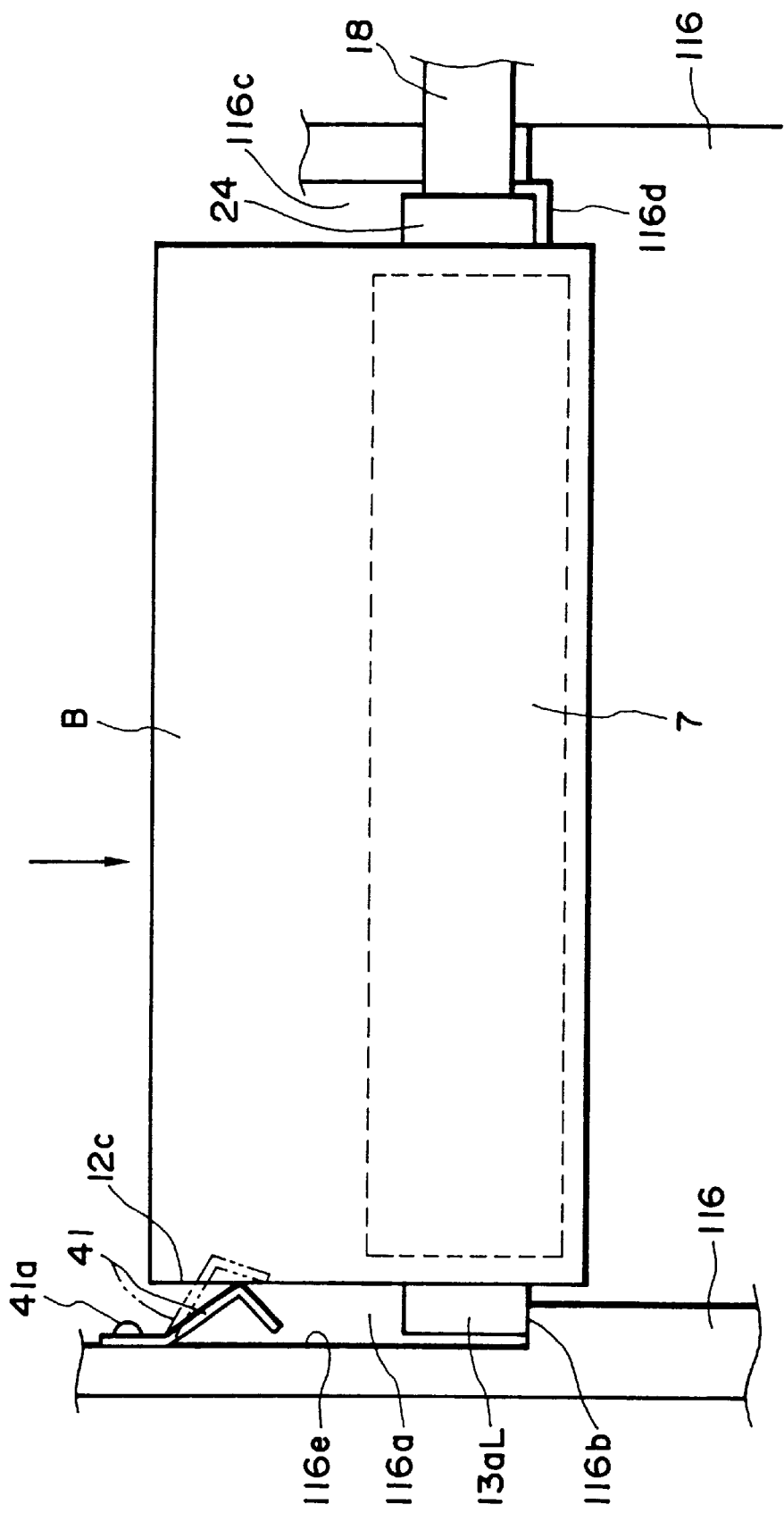
FIG. 30 is a side view wherein an elastic member for urging a process cartridge is provided in the main assembly of the apparatus.

When the process cartridge B is mounted to the main assembly 14 of the image forming apparatus while moving it in the direction indicated by the arrow shown in FIG. 30, the process cartridge B pushes the leaf spring 41 taking a position indicated by the chain lines to the position indicated by the solid lines, as shown in FIG. 30.

The leaf spring 41 is provided adjacent to the U groove 116*b* of the cartridge mounting portion so as to urge the side plate, for example, the flange 29 (FIG. 11) of the cleaning frame 12*c* (it may be called a drum frame since it contains at least the photosensitive drum 7) of the process cartridge B. An end of the leaf spring 41 is fixed by small screw 41*a* to the side surface 116*e* continuing from the guide portion 116*a* so that L-shaped spring action portion is supported in a cantilever fashion.

The leaf spring 41 has a spring force enough to move the process cartridge B in the longitudinal direction, when the process cartridge B is mounted to the cartridge mounting portion of the main assembly 14. The spring force is on the other hand within a range permitting the above-described aligning (centering) function for the shaft coupling. The positioning of the process cartridge B by stopping the movement of the process cartridge B in the longitudinal direction by the leaf spring 41, is effected (1) by abutting, to a member of the main assembly 14, the cylindrical boss 24*a* (FIGS. 11 and 16) projected outwardly from the bearing 24 supporting the male coupling shaft 17, or (2) by abutting, to the mounting guiding member 116, the side plate, for example the mounting flange 13*a*R1, of the cleaning frame 12*c* which side plate is at the longitudinally opposite side of the side plate of the cleaning frame 12*c* abutted to the leaf spring 41. Alternatively, the end surface of the projection 17*a*2 is abutted to a bottom surface 18*a*2 of the recess, or the end surface 16*c* of the drum flange is abutted to the entrance part of the recess 18*a*. It is desirable that adjacent a point of intersection between the line parallel with the photosensitive drum 7 and passing through a point of contact of the leaf spring 41 to one side plate of the cleaning frame 12*c* and the other side plate of the cleaning frame 12*c*, the mounting guiding member 116 is contacted to the other side plate, since then the force applied by the leaf spring 41 to the process cartridge B is not eccentric. The mounting guiding member 116 may be abutted to the other side plate at a large area.

After the process cartridge B is mounted to the cartridge mounting portion of the main assembly 14, the cartridge side shaft coupling member and the main assembly side shaft coupling member of the apparatus are engaged with each other in response to the closing operation of the openable cover 35, as will be described hereinafter.

According to this embodiment, the leaf spring 41 urges the cleaning frame 12*c* which is a frame supporting the photosensitive drum 7. Therefore, no other member is used for the positioning so that assembling accuracy of the frame or the like is not influenced. The side plate of the cleaning frame 12*c* is urged adjacent the cylindrical guide 13*a*L provided at the side opposite from the supporting, positioning and driving side for the process cartridge B. The driving side bearing 24 is raised from the U groove 116*d* at the driving side while the cylindrical guide 13*a*L is supported in the U groove 116*b* provided at the side opposite from the driving side, so that axis of the photosensitive drum 7 is aligned. Since the leaf spring 41 and a cylindrical guide 13*a*L are closer to each other, the coupling alignment operation between the process cartridge B and the main assembly 14 is hardly influenced at this time.

Figure 31:
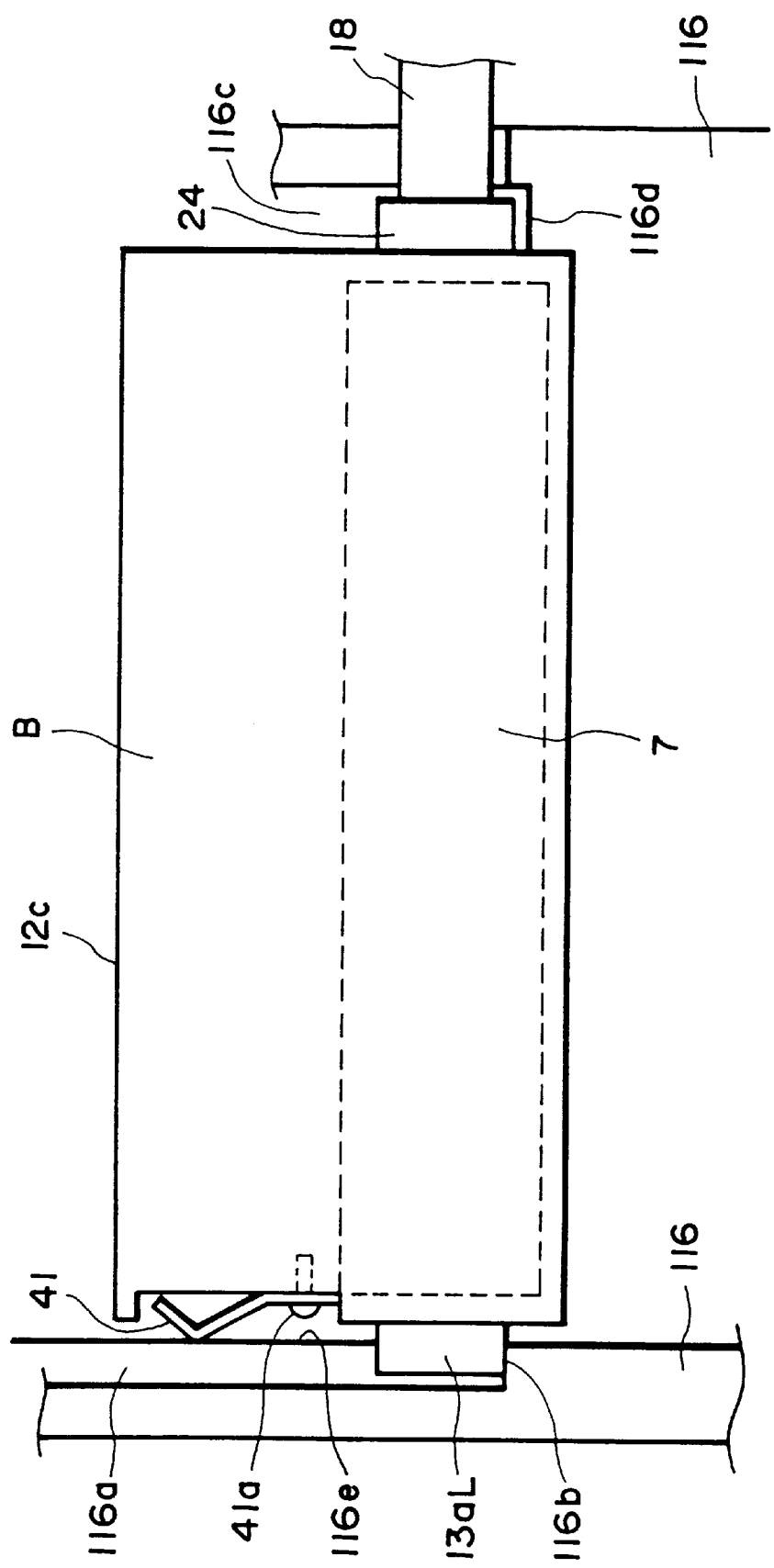
FIG. 31 is a side view wherein an elastic member for urging the process cartridge is provided in the process cartridge.

FIGS. 7 and 31 show examples wherein the process cartridge B rather than the main assembly is provided with a spring 41.

In this embodiment, the leaf spring 41 is mounted to an outer surface of the cleaning frame 12*c* at a side (non-driving side) opposite, in the longitudinal direction of the photosensitive drum, from the side where the male coupling projection 17*a* is provided. The leaf spring 41 takes a position substantially above the guide 13*a*L when the process cartridge is mounted to the main assembly 14. When the process cartridge B is mounted to the main assembly 14, it urges the process cartridge B in the direction of inserting the projection 17*a* into the hole 18*a*.

Therefore, above the cylindrical guide 13*a*L, the leaf spring 41 is fixed to the side plate, for example, the flange 29, of the cleaning frame 12*c* by the small screw 41*a*. The leaf spring 41 has an extension from the end where it is fixed by the small screw 41*a*, the extension being L-shaped and being resiliently deformed by the side surface 116*e* adjacent the guide portion 116*a*.

With such a structure, when the process cartridge B is mounted to the main assembly 14, the leaf spring 41 is abutted to the side surface 116*e* adjacent the main assembly guide 116 so that process cartridge B is urged in the axial direction of the photosensitive drum 7.

Therefore, the process cartridge B can be positioned in the longitudinal direction of the photosensitive drum further stably and further correctly.

In the foregoing embodiment, the leaf spring 41 is disposed at a side opposite from the driving side so as to urge the process cartridge B toward the driving side, but this is not inevitable. For example, the leaf spring 41 may be disposed at the driving side so as to urge the process cartridge B away from the driving side. In such a case, the abutment portions between the process cartridge B and the main assembly 14 may be the cleaning frame 12c of the process cartridge B and a part of the main assembly mounting guide portion 116; or an end surface of the cylindrical guide 13aL and a part of the main assembly mounting guide portion 116.

In the foregoing embodiment, the use is made with a leaf spring, but this is not limiting.

According to the embodiment, the spring member is provided at one longitudinal end portion of the process cartridge, and the spring member is press-contacted to the cartridge mounting portion of the main assembly of the image forming apparatus, and therefore, the process cartridge is urged and positioned to the wall surface at the 116c side of the cartridge mounting portion so that longitudinal position of the process cartridge is assuredly determined. Therefore, the longitudinal position of the electrophotographic photosensitive drum is correctly determined relative to the process cartridge. The shaft coupling is automatically aligned or centered to correctly determine the position of the center of the electrophotographic photosensitive member.

The longitudinal position of the process cartridge can be determined irrespective of the longitudinal position of the spring member.

When the spring member is a leaf spring, the length (height) of the spring may be small so that space required by the provision of the spring member can be saved.

By the provision of the spring member in the drum frame for supporting the electrophotographic photosensitive drum, the assembling accuracy of the process cartridge is not influenced.

The advantageous effects can be provided also in an electrophotographic image forming apparatus having a spring member for urging the process cartridge at one wall surface of the process cartridge mounting portion.

The spring member in the main assembly of the electrophotographic image forming apparatus may be disposed at the driving side or at the non-driving side, and the axial position of the electrophotographic photosensitive member can be correctly positioned in either case.

If the spring member in the main assembly is a leaf spring, the spring member can be disposed without any substantial space for the spring.

Further Embodiments

In the foregoing Embodiment 1, the configurations of the projection 17a of the male coupling shaft 17 and the recess 18a of the female coupling shaft 18 are substantially equilateral triangular prisms, but the configurations are not limited to this. For example, in an alternative, the recess 18a may have a polygonal cross-section having odd number sides, and the projection 17a may be a deformed circle (such as triangle with rounded apices) having the same number of equilateral sides, and the projection 17a may have prism edge lines, and the portion between the edge lines are concave toward the center, for example, the cross-section is a grooved circle.

In the foregoing embodiment, the configurations of the projection 17a of the male coupling shaft 17 and the recess 18a of the female coupling shaft 18 may be such that only one of them is a twisted positive prism configuration.

In the foregoing embodiment, the drum flange 16 and the male coupling shaft 17 are integral with each other, but male coupling shaft 17 may be manufactured separately, and then mounted on the drum flange 16.

The examples of the projection 17a will be described.

Figure 25:
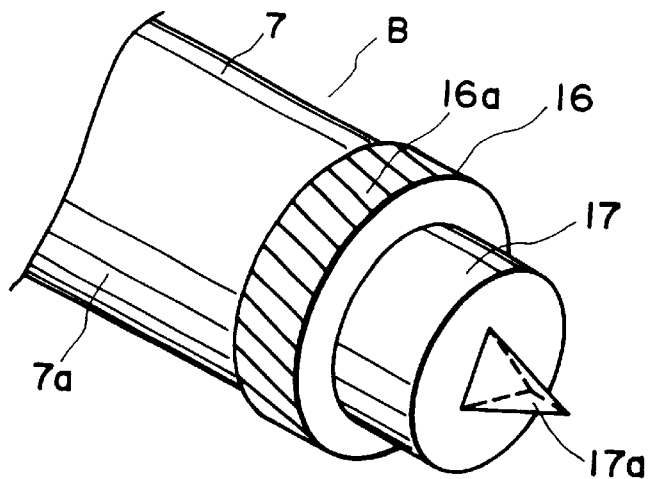
FIG. 25 is a perspective view of a male coupling projection according to another embodiment of the present invention.

In FIG. 25, to the end of the male shaft 17, a substantially triangular pyramid projection 17a is provided. In such a case, when the driving force is transmitted, the base portion of the projection 17a can be abutted to the corner portions of the entrance of the hole since the entrance of the recess 18a is substantially triangular. The projection 17a is not contacted to the inclined surface of the recess 18a.

Figure 26:
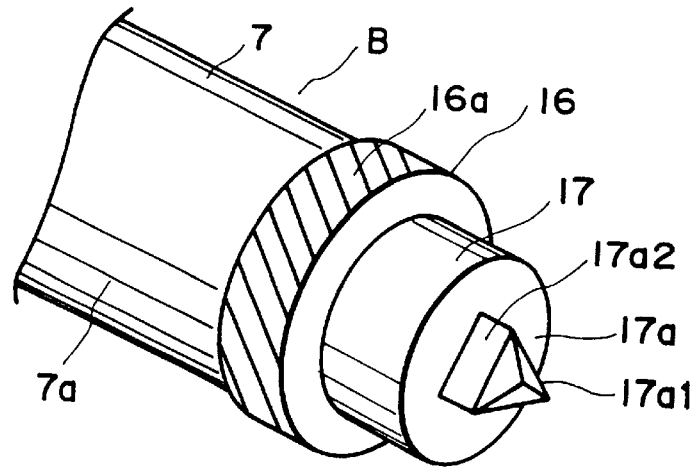
FIG. 26 is a perspective view of a male coupling projection according to a further embodiment of the present invention.

In FIG. 26, the end of the male shaft 17 is provided with a projection 17a which is substantially triangular prism 17a 2, in shape, having a triangular pyramid end 17a 1. In this example, the triangular prism 17a 2 portion is contacted to the corner of the entrance of the recess 18a. The triangular pyramid portion is not contacted to the inclined surface of the recess 18a.

Figure 27:
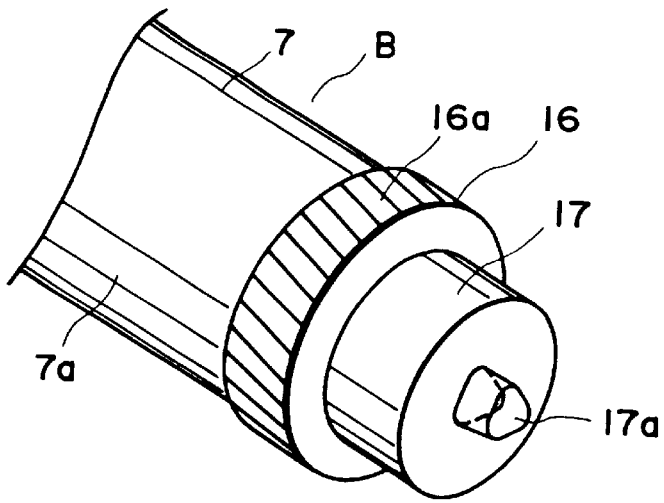
FIG. 27 is a perspective view of a male coupling projection according to a further embodiment of the present invention.

In FIG. 27, the projection 17a is a substantially triangular prism, and the edge lines is are rounded. Referring to FIG. 28, another example of the projection 17a of the male coupling shaft 17 and the recess 18a of the female coupling shaft 18, will be described.

Figure 29:
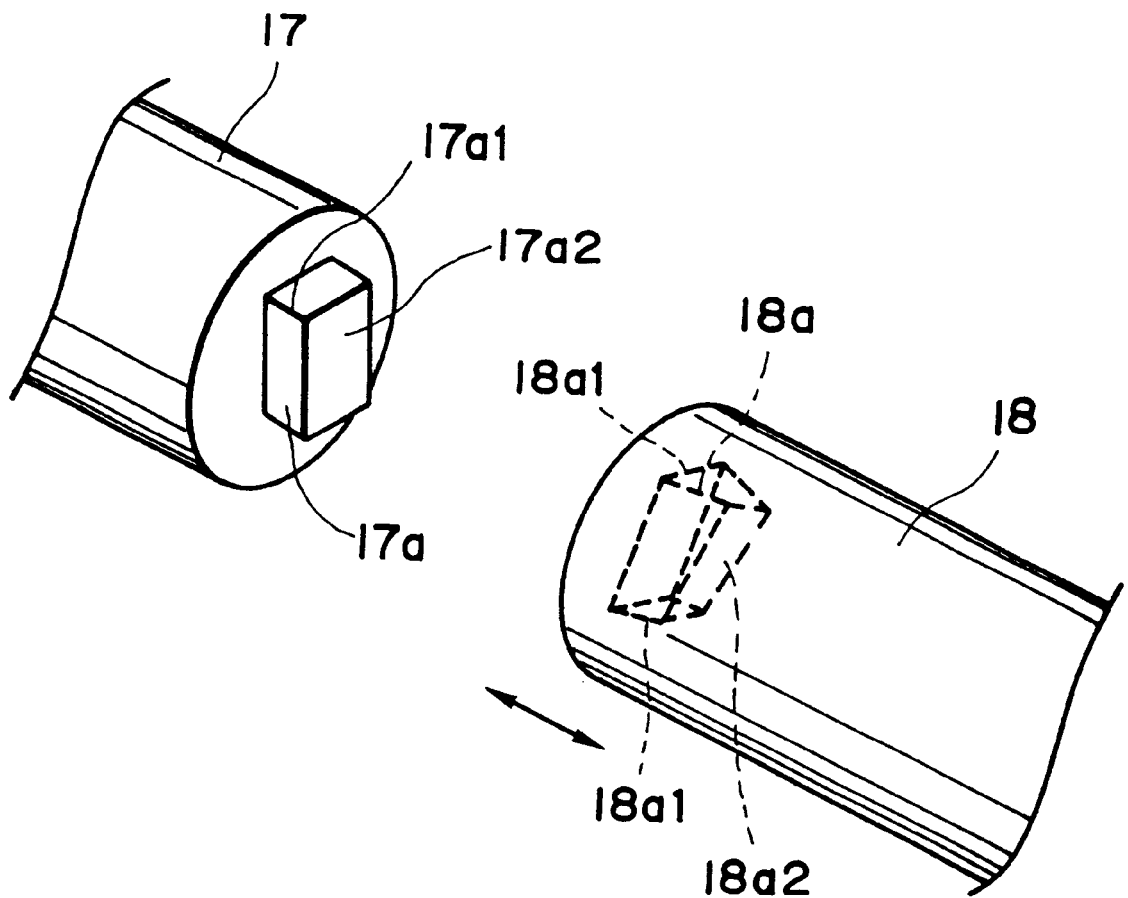
FIG. 29 is a perspective view of a male coupling projection according to a further embodiment of the present invention.

In this embodiment, the configuration of the projection 17a is non-twisted rectangular prism, and the recess 18a to be engaged by the projection 17a is a hole of a twisted rectangular prism (FIG. 29). The twisting direction of the recess 18a is opposite from the rotational direction toward the outside of the main assembly 13 from the photosensitive drum 7 side. When the rotating force of the recess 18a is transmitted to the projection 17a after the projection 17a and the recess 18a provided in the main assembly 13 are engaged, the base portion of the projection 17a and the corners of the entrance of the recess 18a are contacted so that driving force transmission is stable.

In this embodiment, the projection 17a is a rectangular prism, and the recess 18a is a twisted rectangular hole, but this is not inevitable, and another prism configuration is usable. In the foregoing embodiments, the twisting direction of the recess 18a is opposite from the rotational direction of the gear from the entrance of the hole toward the depth.

The amount of the twisting of the hole (projection) is 1°–15° in the rotational direction per axis length of 1 mm.

In this embodiment, the depth of the hole is approx. 4 mm, and the amount of the twisting is approx. 30°.

In the foregoing embodiments, the projection 17a is not twisted. Therefore, the projection 17a is contacted to the entrance of the hole 18a when the driving force is transmitted from the female shaft 18. The projection 17a is not abutted to the inclined surface of the hole 18. By the engagement between the non-twisted projection 17a and the twisted hole 18a, the hole 18a is rotated. Then, the base portion of the projection 17a is contacted to the entrance portion of the hole 18a by which the position thereof relative to the hole 18 is determined. The base portion has a higher strength than the other portion, and therefore, the projection 17a is not deformed. The neighborhood of the corner portion of the projection 17a and/or the corner portion of the entrance of the hole 18a is slightly deformed locally, and bites into the inner surface of the hole. Therefore, the coupling between the recess and the hole is firmer. This advantage is remarkable when they are made of plastic resin material.

As will be understood from the foregoing, the projection may be provided in the main assembly, and the hole may be provided in the process cartridge.

As described in the foregoing, according to the present invention, the driving force can be transmitted stably.

In this embodiment, the process cartridge B was described as a process cartridge which forms a monochromatic image, but the present invention is applicable, with desirable effects, to a process cartridge which comprises a plurality of developing means for forming an image composed of a plurality of colors (for example, two toner image, three tone images, full color image, or the like).

The electrophotographic photosensitive member does not need to be limited to the photosensitive drum 7. For example, the following types may be included. First, as for the photosensitive material, photoconductive material such as amorphous silicon, amorphous selenium, zinc oxide, titanium oxide, organic photoconductor, and the like, may be included. As for the configuration of the base member on which photosensitive material is placed, it may be in the form of a drum or belt. For example, the drum type photosensitive member comprises a cylinder formed of aluminum alloy or the like, and a photoconductor layer deposited or coated on the cylinder.

As for the image developing method, various known methods may be employed; for example, two-component magnetic brush type developing method, cascade type developing method, touch-down type developing method, cloud type developing method, and the like.

Also in this embodiment, a so-called contact type charging method was employed, but obviously, charging means with a structure different from the one described in this embodiment may be employed; for example, one of the conventional structures, in which a tungsten wire is surrounded by a metallic shield formed of aluminum or the like, on three sides, and positive or negative ions generated by applying high voltage to the tungsten wire are transferred onto the surface of a photosensitive drum to uniformly charge the surface of the photosensitive drum.

The charging means may be in the form of a blade (charge blade), a pad, a block, a rod, a wire, or the like, in addition to being in the form of a roller.

As for the method for cleaning the toner remaining on the photosensitive drum, a blade, a fur brush, a magnetic brush, or the like may be employed as a structural member for the cleaning means.

As described in the foregoing, according to the present invention, the driving force can be assuredly transmitted from the main assembly of an electrophotographic image forming apparatus to the electrophotographic photosensitive drum.

As described in the foregoing, according to the present invention, the process cartridge can be positioned in the longitudinal direction of the photosensitive drum further stably and further accurately when the process cartridge is mounted to the main assembly of the apparatus.

While the invention has been described with reference to the structures disclosed herein, it is not confined to the details set forth and this application is intended to cover such modifications or changes as may come within the purposes of the improvements or the scope of the following claims.

What is claimed is:

1. An electrophotographic image forming apparatus for forming an image on a recording material, to a main assembly of which a process cartridge is detachably mountable, said apparatus comprising:

(a) a motor;

(b) a main assembly driving rotatable member for receiving driving force from said motor;

(c) a hole defined by twisted surfaces, said hole being substantially coaxial with said driving rotatable member;

(d) a mounting member for detachably mounting the process cartridge, the process cartridge including:
an electrophotographic photosensitive drum,
process means actable on said photosensitive drum, and
a projection engageable with said twisted surfaces, the projection being provided at a longitudinal end of the photosensitive drum, wherein the projection is non-twisted, and when said main assembly driving rotatable member rotates with said hole and the projection engaged with each other, rotational driving force is transmitted from said driving rotatable member to the photosensitive drum through engagement between said hole and the projection, and
a resilient member for urging the process cartridge in a longitudinal direction of the photosensitive drum, to bring the projection and said hole into position for engagement, when the process cartridge is mounted to the main assembly; and (e) a feeding member for feeding the recording material.

2. An electrophotographic image forming apparatus for forming an image on a recording material, to a main assembly of which a process cartridge is detachably mountable, said apparatus comprising:

(a) a motor;

(b) a driving rotatable member for receiving driving force from said motor;

(c) a twisted recess having a non-circular cross section and being substantially coaxial with a rotation axis of said driving rotatable member;

(d) a mounting member for detachably mounting the process cartridge, the process cartridge including:
a rotatable electrophotographic photosensitive drum,
process means actable on the photosensitive drum,
a projection provided at a longitudinal end of the photosensitive drum, having a non-circular cross section and being substantially coaxial with a rotation axis of the photosensitive drum, wherein the projection is non-twisted, and the projection has such a dimension and configuration that it can take a first relative rotational position with respect to said recess of said driving rotatable member in which relative rotational movement therebetween is permitted, and a second relative rotational position with respect to said recess of said driving rotatable member in which relative rotational movement is prevented in one rotational direction, while the rotation axis of said driving rotatable member and the rotation axis of the photosensitive drum are substantially aligned, and
a resilient member for urging the process cartridge in a longitudinal direction of the photosensitive drum, to bring the projection and said recess into position for engagement, when the process cartridge is mounted to the main assembly; and (e) a feeding member for feeding the recording material.

3. An electrophotographic image forming apparatus for forming an image on a recording material, to a main assembly of which a process cartridge is detachably mountable, said apparatus comprising:

(a) a motor;

(b) a main assembly driving rotatable member for receiving driving force from said motor;

(c) a non-twisted projection, which is substantially coaxial with said driving rotatable member;

(d) a mounting member for detachably mounting the process cartridge, the process cartridge including:

an electrophotographic photosensitive drum,
process means actable on the photosensitive drum,
a hole defined by twisted surfaces, the hole being provided at a longitudinal end of the photosensitive drum, wherein when said main assembly driving rotatable member rotates with said projection and the hole engaged with each other, rotational driving force is transmitted from said driving rotatable member to the photosensitive drum through engagement between the hole and said projection, and
a resilient member for urging the process cartridge in a longitudinal direction of the photosensitive drum, to bring the hole and said projection into position for engagement, when the process cartridge is mounted to the main assembly; and
(e) a feeding member for feeding the recording material.

4. An electrophotographic image forming apparatus for forming an image on a recording material, to a main assembly of which a process cartridge is detachable mountable, said apparatus comprising:
(a) a motor;
(b) a driving rotatable member for receiving driving force from said motor;
(c) a non-twisted projection which is substantially coaxial with a rotation axis of said driving rotatable member;
(d) a mounting member for detachably mounting the process cartridge, the process cartridge including;
a rotational electrophotographic photosensitive drum,
process means actable on the photosensitive drum,
a recess defined by twisted surfaces, the recess being provided at a longitudinal end of the photosensitive drum, and being substantially coaxial with a rotation axis of the photosensitive drum, wherein the recess drum has such a dimension and configuration that it can take a first relative rotational position with respect to said projection of said driving rotatable member in which relative rotational movement therebetween is permitted, and a second relative rotational position with respect to said projection of said driving rotatable, member in which relative rotational movement is prevented in one rotational direction, while the rotation axis of said driving rotatable member and the rotation axis of the photosensitive drum are substantially aligned, and
a resilient member for urging the process cartridge in a longitudinal direction of the photosensitive drum, to bring the recess and said projection into position for engagement, when the process cartridge is mounted to the main assembly; and
(e) a feeding member for feeding and recording material.

5. An electrophotographic image forming apparatus for forming an image on a recording material, to a main assembly of which a process cartridge is detachably mountable, said apparatus comprising:

(a) a motor;
(b) a main assembly driving rotatable member for receiving driving force from said motor;
(c) a non-twisted hole which is substantially coaxial with said driving rotatable member;
(d) a mounting member for detachably mounting the process cartridge, the process cartridge including:
an electrophotographic photosensitive drum,
process means actable on the photosensitive drum,
a twisted projection engageable with said hole, the projection being provided at a longitudinal end of the photosensitive drum, wherein when said main assembly driving rotatable member rotates with said hole and the projection engaged with each other, rotational driving force is transmitted from said driving rotatable member to the photosensitive drum through engagement between said hole and the projection and
a resilient member for urging the process cartridge in a longitudinal direction of the photosensitive drum, to bring the projection and said hole into position for engagement, when the process cartridge is mounted to the main assembly; and
(e) a feeding member for feeding the recording material.

6. An apparatus according to claims 1, 2, 3, 4, or 5, wherein the resilient member is provided at a side where the main assembly transmits driving force to the photosensitive drum.

7. An apparatus according to claim 6, wherein the resilient member is a leaf spring.

8. An apparatus according to claims 1, 2, 3, 4 or 5, wherein the resilient member is provided opposite from a side where the main assembly transmits driving force to said photosensitive drum.

9. An apparatus according to claim 8, wherein the resilient member is a leaf spring.

10. An image forming apparatus according to claims 1, 3, 4 or 5, wherein said image forming apparatus further comprises:
an openable member which is openable and closeable when the process cartridge is mounted or demounted from said main assembly; and
a movable member for moving said driving rotatable member in the axial direction of said driving rotatable member away from a process cartridge mounting position in interrelation with an opening operation of said openable member, and for moving said driving rotatable member in the axial direction of said driving rotatable member toward the process cartridge mounting position in interrelation with a closing operation of said openable member.

* * * * *

UNITED STATES PATENT AND TRADEMARK OFFICE
CERTIFICATE OF CORRECTION

PATENT NO. : 6,330,409 B1
DATED : December 11, 2001
INVENTOR(S) : Kazushi Watanabe et al.

It is certified that error appears in the above-identified patent and that said Letters Patent is hereby corrected as shown below:

Column 1,
Line 15, "includes" should read -- include --.

Column 3,
Line 36, "24(b)" should read -- 24(b) are --.

Column 5,
Line 61, "11" should read -- 11, --.

Column 7,
Line 26, "18" should read -- 18, --.

Column 8,
Line 51, "a" should be deleted.

Column 10,
Line 22, "16a and 16e" should read -- 116a and 116e --.
Line 31, "16a and 16e" should read -- 116a and 116e --.

Column 15,
Line 9, "a" should be deleted.
Line 31, "65a" should read -- 63 --.
Line 48, "65A" should read -- 65a --.
Line 50, "63A" should read -- 63a --.

Column 16,
Line 36, "116d" should read -- 116b --.

Column 17,
Line 26, "FIG. 24(A)." should read -- FIG. 24(a)). --.
Line 29, "FIG. 24(B)." should read -- FIG. 24(b)). --.

Column 18,
Line 59, "13AL" should read -- 13aL --.

Column 22,
Line 16, "is" should be deleted.
Line 21, "is" should read -- is a --.

UNITED STATES PATENT AND TRADEMARK OFFICE
CERTIFICATE OF CORRECTION

PATENT NO. : 6,330,409 B1
DATED : December 11, 2001
INVENTOR(S) : Kazushi Watanabe et al.

It is certified that error appears in the above-identified patent and that said Letters Patent is hereby corrected as shown below:

Column 25,
Line 19, "detachable" should read -- detachably --.
Line 28, "including;" should read -- including: --.
Line 41, "rotatable," should read -- rotatable --.

Column 26,
Line 19, "jection" should read -- jection, --.

Signed and Sealed this

Second Day of July, 2002

Attest:

JAMES E. ROGAN
Attesting Officer   Director of the United States Patent and Trademark Office